(12) United States Patent
Adgaonkar et al.

(10) Patent No.: US 8,117,059 B1
(45) Date of Patent: Feb. 14, 2012

(54) PULL PLANNING FOR SERVICEABLE PARTS TO FACILITATE ON-DEMAND REPAIR PLANNING

(75) Inventors: Amol B. Adgaonkar, Arlington, TX (US); Deepak Rammohan, Irving, TX (US); Pradip Som, Corinth, TX (US); Thomas Burkhardt, Dallas, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1356 days.

(21) Appl. No.: 10/224,240

(22) Filed: Aug. 19, 2002

(51) Int. Cl.
*G06Q 10/00* (2006.01)

(52) U.S. Cl. ..................................... 705/7.31

(58) Field of Classification Search .............. 705/8, 7, 705/9, 7.31
See application file for complete search history.

(56) References Cited

U.S. PATENT DOCUMENTS

| | | | | |
|---|---|---|---|---|
| 5,287,267 A | | 2/1994 | Jayaraman et al. ........... | 364/403 |
| 5,765,143 A | | 6/1998 | Sheldon et al. ............... | 705/28 |
| 5,826,236 A | * | 10/1998 | Narimatsu et al. ............ | 705/8 |
| 5,946,662 A | | 8/1999 | Ettl et al. ...................... | 705/8 |
| 5,974,395 A | | 10/1999 | Bellini et al. .................. | 705/9 |
| 6,151,582 A | * | 11/2000 | Huang et al. .................. | 705/8 |
| 6,324,522 B2 | | 11/2001 | Peterson et al. ............... | 705/28 |
| 6,430,541 B1 | | 8/2002 | Brown et al. .................. | 705/28 |
| 6,486,899 B1 | | 11/2002 | Bush, Jr. ....................... | 345/855 |
| 6,560,509 B2 | | 5/2003 | Williams et al. .............. | 700/216 |
| 7,058,587 B1 | * | 6/2006 | Horne ............................ | 705/7 |
| 2002/0188494 A1 | * | 12/2002 | Budnik et al. ................. | 705/9 |

OTHER PUBLICATIONS

Patton et al. Service Parts Handbook, The Solomon Press Publishers, New York. 1997.*
Van det Laan et al. Production planning and inventory control with remanufacturing and disposal. Elsevier Science, European Journal of Operations Research, 102 264-278. 1997.*
Ashayeri et al. Inventory management of repairable service parts for personal computers: A case study. International Journal of Operations and Production Management. Bradford: 1996. vol. 16, Iss. 12, p. 74.*
Amol B. Adgaonkar et al., "Push Planning for Unserviceable Parts to Facilitate Repair Planning in a Repair Network," U.S. Appl. No. 10/223,925, 66 pages, Aug. 19, 2002.
Amol B. Adgaonkar et al., "Pull Planning for Unserviceable Parts in connection with On-Demand Repair Planning," U.S. Appl. No. 10/691,320, 67 pages, Oct. 22, 2003.

* cited by examiner

*Primary Examiner* — Andre Boyce
(74) *Attorney, Agent, or Firm* — Booth Udall, PLC; Steven J. Laureanti

(57) ABSTRACT

In an embodiment, a method for on-demand repair planning includes modeling for a repair location: a good parts buffer; a first buffer for unserviceable parts determined to be serviceable without repair; and a second buffer for unserviceable parts determined to be repairable. A forecasted demand, for a specified quantity of serviceable parts, is accessed. Parts available in the first buffer to help satisfy the forecasted demand is estimated. If a part is available, an operation plan is generated for a use-as-is operation. If the forecasted demand is not fully satisfied, a quantity of parts available in the second buffer to help satisfy the forecasted demand is estimated and, if one or more parts are available: the latest time at which a repair operation can begin is estimated; a repair order is planned; and an operation plan is generated for the repair operation.

64 Claims, 7 Drawing Sheets

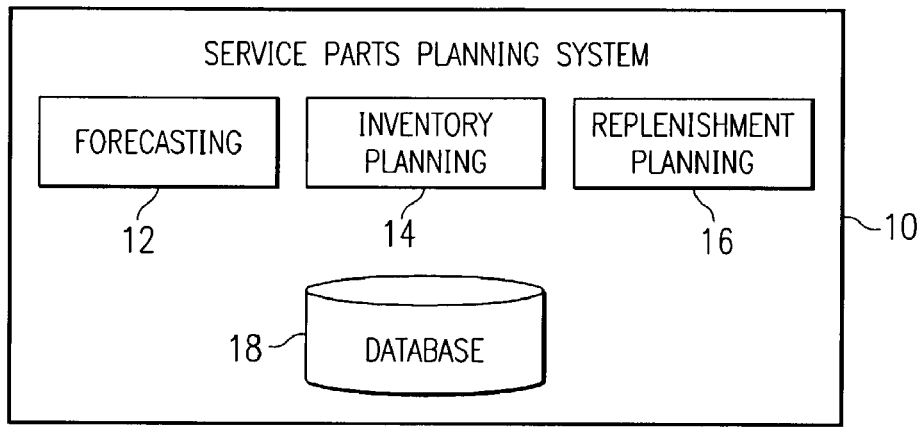
*FIG. 1*
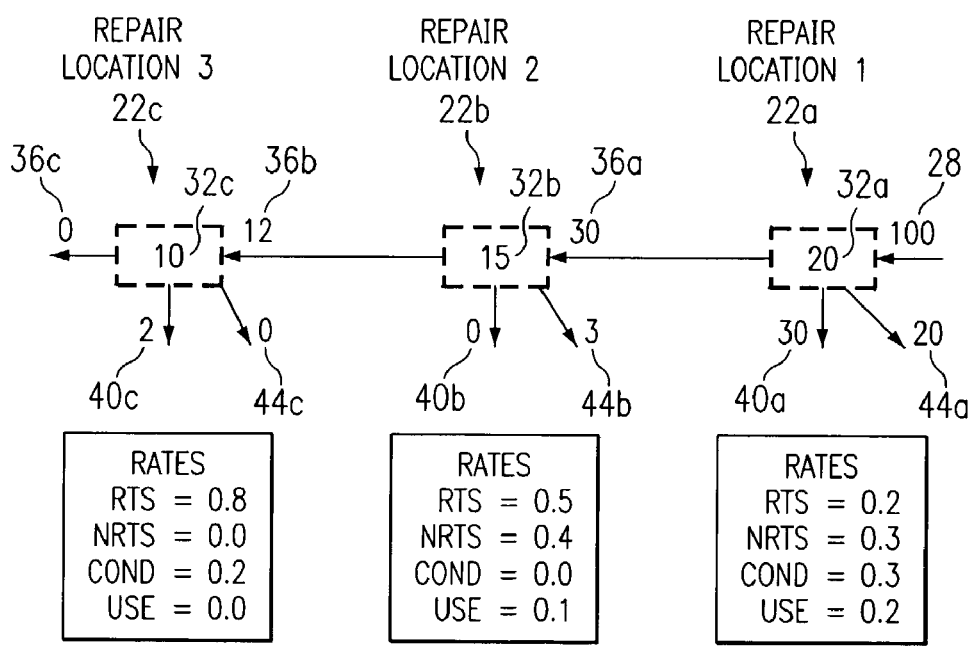
*FIG. 3*

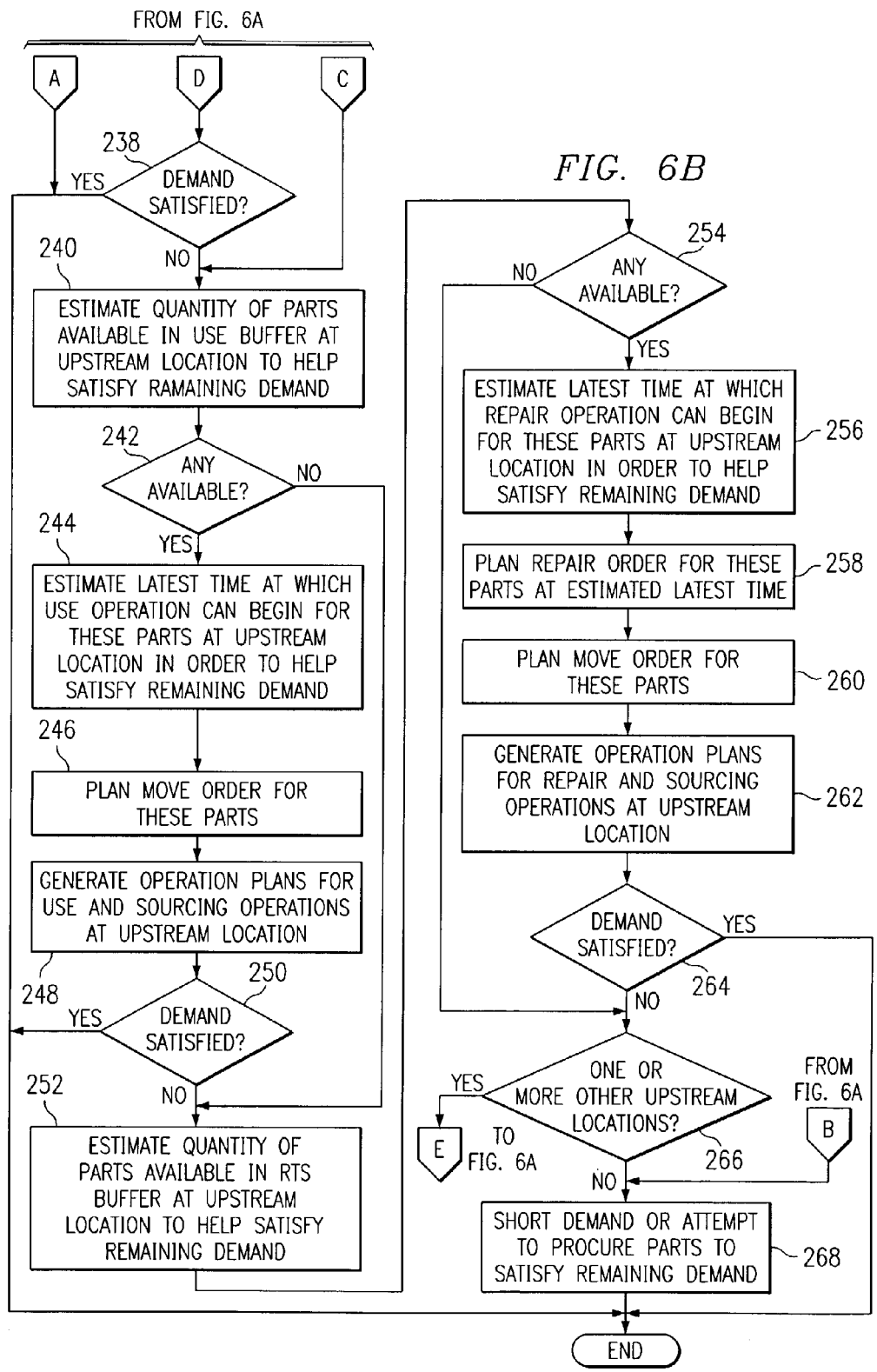

PULL PLANNING FOR SERVICEABLE PARTS TO FACILITATE ON-DEMAND REPAIR PLANNING

RELATED APPLICATIONS

This application is related to U.S. application Ser. No. 10/223,845 filed Aug. 19, 2002, entitled "On-Demand Repair Planning," now U.S. Pat. No. 7,620,561 and U.S. application Ser. No. 10/223,925 filed Aug. 19, 2002, entitled "Push Planning for Unserviceable Parts to Facilitate Repair Planning in a Repair Network," now U.S. Pat. No. 7,277,862 both by Amol B. Adgaonkar, Deepak Rammohan, Pradip Som, and Thomas Burkhardt. U.S. Pat. No. 7,620,561 and U.S. Pat. No. 7,277,862 are commonly assigned to the assignee of the present invention. The disclosures of the related patent applications are hereby incorporated by reference for all purposes as if fully set forth herein.

TECHNICAL FIELD OF THE INVENTION

This invention relates generally to service parts planning and more particularly to pull planning for serviceable parts to facilitate on-demand repair planning.

BACKGROUND OF THE INVENTION

A critical aspect of many supply chains is a network of repair locations that cooperate to receive, diagnose, and repair broken or otherwise unusable parts so that these parts can be returned to service and consumed similar to regular inventory. For example, a typical multi-level repair network may include, within a first level, a number of repair centers at a number of locations that receive, diagnose, and repair unusable parts and may each specialize in repairing a particular type of part. If a repair center is able to repair a part, then the repair center may repair the part and ship the repaired part to one of a number of stocking locations for consumption. If the repair center is unable to repair the part, however, then the part may need to be shipped to one of a number of central repair centers within a second level, which may each specialize in repairing a particular type of part, where the part is again received, diagnosed, and hopefully repaired. If the central repair center is able to repair a part, then the repair center may ship the repaired part to an appropriate stocking location. If the central repair center is unable to repair the part, however, then the part may need to be further shipped to a vendor of the part within a third level, where the part is once again received, diagnosed, and hopefully repaired. If the vendor is able to repair a part, the vendor may ship the repaired part to an appropriate stocking location or warehouse. If the vendor is unable to repair the part, however, the part may simply be discarded.

In certain industries, such repair processes may be very expensive, involving costs associated with temporary storage, diagnosis, and possibly repair of a part at each repair location in the repair network to which the part is shipped. Additional costs are incurred while a part remains unconsumed at a stocking location. Further costs must be incurred to ship a part between repair locations in the repair network. Repair planning involves attempts to minimize undesirable costs associated with broken or otherwise unusable parts to improve the cost-efficiency of the supply chain and increase overall profitability. Previous repair planning techniques have been inadequate in many supply chain environments.

SUMMARY OF THE INVENTION

According to the present invention, disadvantages and problems associated with previous repair planning techniques may be reduced or eliminated.

In one embodiment of the present invention, a method for on-demand repair planning includes modeling for a repair location in a repair network: (1) a good parts buffer for serviceable parts available to be put to service to help satisfy a demand; (2) a first buffer for unserviceable parts inspected at the repair location and determined to be serviceable without repair; and (3) a second buffer for unserviceable parts inspected at the repair location and determined to be repairable at the repair location. A forecasted demand, for a specified quantity of serviceable parts at a specified future time at the repair location, is accessed. A quantity of parts available in the first buffer to help satisfy the forecasted demand is estimated and, if one or more parts are available, an operation plan is generated for a use-as-is operation with respect to these available parts, the use-as-is operation operable to pull these available parts from the first buffer to the good parts buffer to help satisfy the forecasted demand. If the forecasted demand is not fully satisfied, a quantity of parts available in the second buffer to help satisfy the forecasted demand is estimated and, if one or more parts are available: (1) the latest time at which a repair operation can begin with respect to these available parts in order to help satisfy the forecasted demand is estimated, the repair operation operable to pull these available parts from the second buffer to the good parts buffer to help satisfy the forecasted demand; (2) a repair order is planned for these available parts at the estimated latest time; and (3) an operation plan is generated for the repair operation with respect to these available parts.

Particular embodiments of the present invention may provide one or more technical advantages. For example, particular embodiments may provide on-demand repair planning, for each of a number of time periods in a planning horizon, based on one or more demands for parts at one or more future times at one or more repair locations. In particular embodiments, a repair location at which the demand exists may be one of multiple repair locations in a multi-level repair network. In particular embodiments, a part may be repaired at a repair location at a latest time that allows the part to be available to help satisfy a demand at a repair location at which the demand exists. In particular embodiments, a part may be moved between repair locations at a latest time that allows the part to be available to help satisfy a demand at a repair location at which the demand exists. In particular embodiments, determining a latest time at which a part can be repaired at a repair location or moved between repair locations may reflect one or more disposition times associated with inspections of the part at one or more repair locations, repair lead times associated with repair of the part at a repair location, one or more move lead times associated with movement of the part between repair locations, and any other appropriate time constraints. In particular embodiments, the present invention allows parts to be repaired (and moved where appropriate) in a "just-in-time" manner, these decisions being made for each of a number of time periods in a planning horizon, each part being repaired (and moved where appropriate) only when needed to satisfy a demand and as late in time as is possible to satisfy the demand. In particular embodiments, the generation of planned repair and move orders may also help integrate planning with execution.

In particular embodiments, the ability to provide on-demand repair planning may minimize undesirable costs associated with broken or otherwise unusable parts, improving the cost-efficiency of the supply chain and increasing overall profitability. For example, in particular embodiments, it may be desirable to repair a part as late in time as possible in order to delay commitment of scarce capital or other resources to the repair process and to make these capital and other resources available for other business activities. As a more particular example, delaying repair may help prevent adding value to a part through repair only to have the repaired part "sit on the shelf" due to a lack of demand. As another more particular example, delaying repair may help minimize losses where the repaired part is likely to suffer attrition due to shelf-life constraints or obsolescence.

Certain embodiments of the present invention may provide all, some, or none of these technical advantages. Certain embodiments may provide one or more other technical advantages, one or more of which may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example service parts planning system;

FIG. 3 illustrates an example flow of unserviceable parts through a series of repair locations in a repair network;

FIGS. 6A and 6B illustrate an example pull planning phase of a repair planning process.

DESCRIPTION OF EXAMPLE EMBODIMENTS

Figure 2:
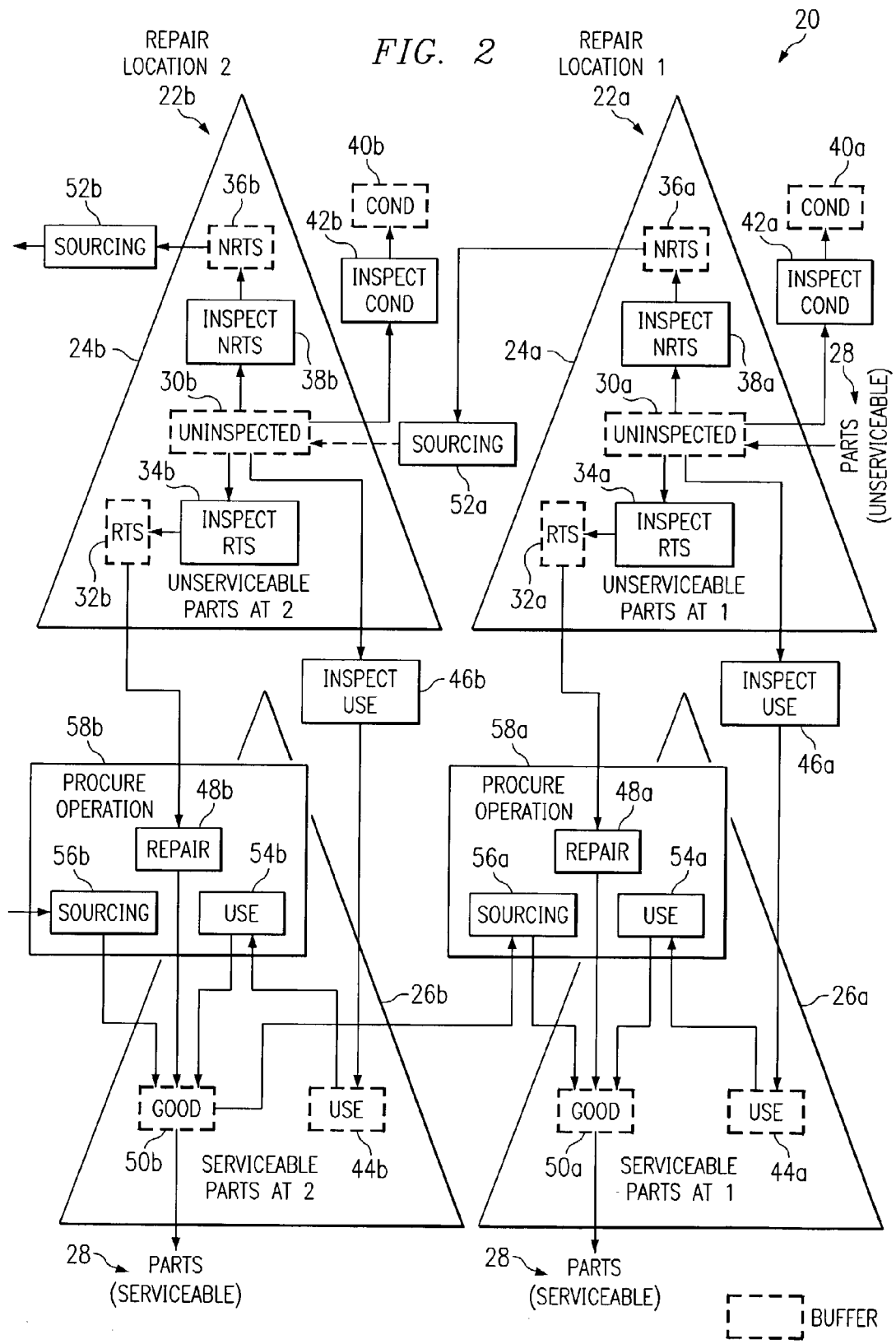
FIG. 2 illustrates example replenishment planning logic modeled within a replenishment planning system for on-demand repair planning.

FIG. 1 illustrates an example service parts planning system 10. In general, system 10 generates plans relating to supply of service parts to replace broken or otherwise unusable parts. For example, unusable parts may include parts that were unusable at the time the parts were manufactured, parts that became unusable during service, or any other unusable parts.

In one embodiment, system 10 includes a forecasting engine 12 that generates demand forecasts for service parts based on future estimates regarding the number of parts that will break or otherwise become unusable and will need to be replaced. A separate demand forecast may be generated for each of a number of service parts for each of a number of forecasting periods. For example, forecasting engine 12 may generate a new demand forecast for a particular part each month for a specified time period in the future. The time period for a demand forecast is preferably longer than the time to complete the longest expected repair process for the part associated with the demand forecast. For example, in a multi-level repair network including repair centers, central repair centers, vendors, and forward stocking locations, the longest expected repair process may include the sum of: (1) the time to ship the part to the repair center, (2) the time to receive and diagnose a part at a repair center, (3) the time to ship the part from the repair center to a central repair center, (4) the time to receive and diagnose the part at the central repair center, (5) the time to ship the part from the central repair center to the vendor, (6) the time to receive and diagnose the part at the vendor, (7) the time to repair the part at the vendor, and (8) the time to ship the part from the vendor to a central warehouse. For certain parts in certain industries, the horizon corresponding to demand forecasts may therefore need to be several months in length.

System 10 may also include an inventory planning engine 14 that generates inventory plans for service parts, based on demand forecasts obtained from forecasting engine 12, regarding the number of parts that must be maintained in inventory to meet the forecasted demand. A separate inventory plan may be generated for each of a number of service parts for each of a number of planning periods. For example, inventory planning engine 14 may generate a new inventory plan for a particular part each month for a specified time period in the future.

System 10 may also include a replenishment planning engine 16 that generates replenishment plans for service parts, based on demand forecasts obtained from forecasting engine 12, regarding the number of parts that must be repaired through an associated repair network, moved from one location to another location in the repair network, or purchased from a vendor in order to meet the forecasted demand. Replenishment plans are generated for each of a number of service parts throughout the replenishment planning horizon. For example, replenishment planning engine 16 may generate a new replenishment plan for a particular part each day for a specified time period in the future. Each such replenishment plan may specify some combination of repair orders that initiate repair processes, move orders that initiate move processes, and purchase orders that initiate purchase processes. According to the present invention, a replenishment plan may be derived according to on-demand repair planning executed at replenishment planning engine 16. As used herein, the phrase "on-demand" may in particular embodiments be, but need not necessarily be, considered to mean "just-in-time" in the sense that repair orders are planned such that parts are repaired at the latest possible time to satisfy demand.

Particular embodiments of the present invention may provide one or more technical advantages. For example, particular embodiments may provide on-demand repair planning, for each of a number of time periods in a planning horizon, based on one or more demands for parts at one or more future times at one or more repair locations. In particular embodiments, a repair location at which the demand exists may be one of multiple repair locations in a multi-level repair network. In particular embodiments, a part may be repaired at a repair location at a latest time that allows the part to be available to help satisfy a demand at a repair location at which the demand exists. In particular embodiments, a part may be moved between repair locations at a latest time that allows the part to be available to help satisfy a demand at a repair location at which the demand exists. In particular embodiments, determining a latest time at which a part can be repaired at a repair location or moved between repair locations may reflect one or more disposition times associated with inspections of the part at one or more repair locations, repair lead times associated with repair of the part at a repair location, one or more move lead times associated with movement of the part between repair locations, and any other appropriate time constraints. In particular embodiments, the present invention allows parts to be repaired (and moved where appropriate) in a "just-in-time" manner, these decisions being made for each of a number of time periods in a planning horizon, each part being repaired (and moved where appropriate) only when needed to satisfy a demand and as late in time as is possible to satisfy the demand. In particular embodiments, the generation of planned repair and move orders may also help integrate planning with execution.

In particular embodiments, the ability to provide on-demand repair planning may minimize undesirable costs associated with broken or otherwise unusable parts, improving the cost-efficiency of the supply chain and increasing overall profitability. For example, in particular embodiments, it may be desirable to repair a part as late in time as possible in order to delay commitment of scarce capital or other resources to the repair process and to make these capital and other resources available for other business activities. As a more particular example, delaying repair may help prevent adding value to a part through repair only to have the repaired part "sit on the shelf" due to a lack of demand. As another more particular example, delaying repair may help minimize losses where the repaired part is likely to suffer attrition due to shelf-life constraints or obsolescence.

System 10 may include a server system that includes one or more computer systems at one or more locations. Engines 12, 14, 16 may be separate processes each executing on a dedicated processor or may be integrated in whole or in part, for example, all executing on a single processor. Each engine 12, 14, 16 may receive input data from database 18 or otherwise, manipulate the input data and any other suitable data as appropriate, and interact with database 18 as appropriate to provide output data representing demand forecasts, inventory plans, and replenishment plans. Engines 12, 14, 16 may be fully autonomous or may operate at least in part subject to input from users of system 10. Database 18 may provide persistent data storage for system 10 and may store any data suitable to support the operation of system 10. Although the term "database" is used, memory closely associated with one or more engines 12, 14, 16 or another suitable data storage arrangement may be used. Use of the term "database" is meant to encompass all suitable data storage arrangements. In one embodiment, database 18 is populated with data received from one or more data sources internal, external, or both internal and external to the enterprise or facility associated with system 10.

FIG. 2 illustrates example replenishment planning logic 20 modeled within replenishment planning engine 16. Logic 20 may include representations of any suitable number of repair locations 22 within an applicable multi-level repair network. For simplicity, only two repair locations 22a and 22b are illustrated. As an example, the first repair location 22a may be a repair center within a first level in a multi-level repair network, while the second repair location 22b may be an upstream central repair center within a second level in the multi-level repair network. More generally, repair locations 22a, 22b may be any suitable repair locations within the same or different levels of a multi-level repair network.

In one embodiment, a repairable part may have one of two possible states: (1) a serviceable state (meaning that the part is suitable to be put to service), or (2) an unserviceable state (meaning that the part is broken or otherwise unusable and is not suitable to be put to service). In many cases, it is desirable to replenish serviceable parts inventory using parts that are consumed from unserviceable parts inventory after being repaired. Accordingly, in one embodiment, logic 20 includes an Unserviceable buffer 24 and a Serviceable buffer 26 for each repair location 22 within the repair network. Replenishment planning engine 16 may track each part 28 as it moves in accordance with logic 20. Unserviceable parts 28 and serviceable parts 28 may be tracked separately from serviceable parts 28, a suitable transition being made when a part 28 moves from an unserviceable to a serviceable state.

For any buffer within logic 20, a graph of the quantity of parts (i.e. inventory) in the buffer for each of a series of time periods within a planning horizon may be referred to as the buffer profile for the buffer. For example, the time periods may be days such that the buffer profile may indicate the inventory for each day within the planning horizon. Each buffer profile may be constructed according to the inventory produced into the buffer (i.e. incoming inventory) from one or more downstream repair locations 22 at each time period and, similarly, the inventory consumed from the buffer (i.e. outgoing inventory) to one or more upstream repair locations 22 at each time period. It may be desirable to classify inventory already within the buffer at a time period as incoming inventory at the time period. In this case, the inventory in the buffer at any time period is the incoming inventory minus the outgoing inventory, which may be negative under certain circumstances (e.g., if a shipment is approved without any inventory being available). One type of operation plan for an operation may consume from an originating buffer (resulting in an inventory decrease in the associated buffer profile) at a start time of the operation plan and produce into a destination buffer (resulting in an inventory increase in the associated buffer profile) at an end time of the operation plan. Another type of operation plan for an operation may produce into a destination buffer without consuming from an originating buffer, such as in situations where consumption from the originating buffer has already been accounted for.

For purposes of simplicity, operation of logic 20 is described with respect to parts of a particular type, for example, all having the same part number. However, the present invention contemplates logic 20 operating substantially simultaneously with respect to parts of multiple types, for example, having different part numbers. In this case, data associated with parts 28 of a particular type is preferably maintained and processed separately from data associated with parts 28 of other types.

In operation of logic 20, unserviceable parts 28 flow into an Uninspected buffer 30a of first repair location 22a. In one embodiment, the buffer profile for an Uninspected buffer 30 may be a determined, for a specified time, according to: (1) incoming inventory including parts 28 within Uninspected buffer 30 (i.e. on hand) at the time, parts 28 in transit or otherwise approved for shipment from one or more downstream repair locations 22 (e.g., reflected in approved move orders) and in an uninspected state at the time, actual demand for parts 28 (e.g., reflected in confirmed repair return requests) at the time, and forecasted demand for parts 28 (e.g., reflected in netted repair return forecasts) at the time; and (2) outgoing inventory including parts 28 approved for inspection at the time. Because parts 28 arrive at first repair location 22a in an uninspected state, each part 28 in Uninspected buffer 30a must be inspected according to an Inspection operation and assigned an appropriate condition state. Each Inspection operation may involve one or more received parts 28. In one embodiment, each part 28 may be assigned one of the following condition states: (1) RTS ("Repairable at This Station"), meaning that part 28 is repairable at first repair location 22a; (2) NRTS ("Not Repairable at This Station"), meaning that part 28 is not repairable at first repair location 22a; (3) COND ("Condemnable"), meaning that part 28 is not repairable at any repair location 22 and must be discarded; or (4) USE ("Use As Is"), meaning that part 28 was erroneously reported as unserviceable, does not need to be repaired, and may be put to service in its current condition. The RTS, NRTS, COND, and USE terms are used identically throughout the remainder of this document (e.g., USE stands for "Use As Is" in each case). The time required for the Inspection operation may be referred to as the disposition time and may, where appropriate, be represented as a fixed number of days. For example, if incoming inventory arrives at time t=0, then with a one day disposition time that inventory would not be available for any other operation until time t=1.

Where each received part 28 must be assigned one of the four condition states described above, the sum of the rates at which parts 28 are assigned each condition state equals one (i.e. RTS_Rate+NRTS_Rate+COND_Rate+USE_Rate=1.00). In general, a part 28 assigned an NRTS condition state may be sent to any one of a number of other repair locations 22 for repair. Accordingly, a separate NRTS rate may be determined for each other repair location 22 to which parts 28 may be sent and the total NRTS rate for parts 28 may be the sum of the NRTS rates for all other repair locations 22 to which parts 28 may be sent. It may often be desirable to track the rate for each condition state over a specified time period and use the determined rates as default values for repair planning purposes. For example, given a forecasted demand for unserviceable parts 28 and the rate for each condition state for parts 28, a quantity of parts 28 that will be assigned each condition state may be forecasted (e.g., Unserviceable_Demand_Forecast*NRTS_Rate=NRTS_ Quantity) for repair planning purposes. In one embodiment, however, where a specified quantity of parts 28 must be repaired or moved between repair locations 22 at a specified time, a confirmed repair or move order, respectively, may be generated to override or increment the RTS rate or NRTS rate, respectively, that would otherwise be used for repair planning purposes.

Where the demand forecasts obtained from forecasting engine 12 represent forecasted returns of unserviceable parts 28, replenishment planning engine 16 may use the forecasted demand directly in its repair planning operations. However, where the demand forecasts obtained from forecasting engine 12 represent forecasted demand for serviceable parts 28, it may not be reasonable in certain cases to equate the received forecasted demand with forecasted demand for unserviceable parts 28. For example, a certain percentage of parts needing replacement may have exploded, may have been lost at the location of failure, or may otherwise be unavailable for repair within the repair network, yet the demand for serviceable replacements for these parts remains present. Accordingly, replenishment planning engine 16 may apply a yield rate to a forecasted demand for serviceable parts 28 obtained from forecasting engine 12 in order to generate a forecasted demand for unserviceable parts 28 that replenishment planning engine 16 may use in its repair planning operations. For example, given a forecasted demand for serviceable parts 28 and a yield rate, a demand for unserviceable parts 28 may be forecasted (e.g., Serviceable_Demand_Forecast*Yield_Rate= Unserviceable_Demand Forecast).

In one embodiment, logic 20 models the Inspection operation associated with Uninspected buffer 30a using four sub-operations, one sub-operation for each of the RTS, NRTS, COND, and USE condition states. Based on the Inspection operation, each part 28 may be allocated through a corresponding sub-operation to one of the following buffers: (1) RTS buffer 32a through an Inspect RTS sub-operation 34a; (2) NRTS buffer 36a through an Inspect NRTS sub-operation 38a; (3) COND buffer 40a through an Inspect COND sub-operation 42a; or (4) USE buffer 44a through an Inspect USE sub-operation 46a. The disposition times for sub-operations 34a, 38a, 42a, and 46a are preferably the same, such that a single disposition time is associated with the Inspection operation regardless of which sub-operations 34a, 38a, 42a, and 46a are performed with respect to particular parts 28.

In one embodiment, the buffer profile for RTS buffer 32 may be a determined for a specified time according to: (1) incoming inventory including parts 28 within RTS buffer 32 (i.e. on hand) at the time and parts 28 that are in transit or otherwise approved for shipment from one or more downstream repair locations 22 (e.g., reflected in approved move orders) and are in a repairable state at the time; and (2) outgoing inventory including parts 28 approved for repair (e.g., reflected in approved repair orders) at the time. The buffer profile for NRTS buffer 36 may be determined for a specified time according to: (1) incoming inventory including parts 28 within NRTS buffer 32 (i.e. on hand) at the time and parts 28 that are in transit or otherwise approved for shipment from one or more downstream repair locations 22 (e.g., reflected in approved move orders) and are in a non-repairable state at the time; and (2) outgoing inventory including parts 28 approved for shipment to one or more upstream repair locations 22 (e.g., reflected in approved move orders) at the time. The inventory reflected in the buffer profile of Unserviceable buffer 24 at a specified time equals the sum of the inventories reflected in the buffer profiles of Uninspected buffer 30, RTS buffer 32, and NRTS buffer 36 at the time.

From NRTS buffer 36a, parts 28 may be produced into Uninspected buffer 30b of second repair location 22b through a suitable Sourcing operation 52a. In one embodiment, instead of or in addition to being produced into Uninspected buffer 30b, parts 28 may be consumed from NRTS buffer 36a and produced into RTS buffer 32b or NRTS buffer 36b of second repair location 22b directly without first passing through Uninspected buffer 30b. As described above, although second repair location 22b is illustrated, parts 28 may be consumed from NRTS buffer 36a and moved to any suitable number of other repair locations 22 through any suitable Sourcing operations 52. Each Sourcing operation 52 may be implemented according to a reverse bill of distribution (BOD) and an associated move order that initiates shipment of unserviceable parts 28 from one repair location 22 to another repair location 22 in the repair network. Since moving a part 28 from one repair location 22 to another repair location 22 through Sourcing operation 52 must take at least some time, a move lead time is associated with each move. The move lead time may differ depending on the originating and terminating repair locations 22. In one embodiment, a move lead time may be represented as a fixed number of days. For example, if parts 28 assigned an NRTS condition state are moved from first repair location 22a to second repair location 22b at time t=1, then with a one day move lead time parts 28 would not be available for inspection at second repair location 22b until time t=2.

From RTS buffer 32a, parts 28 may be repaired at first location 22a through a Repair operation 48a and produced into a Good buffer 50a for first location 22a. Since repairing a part 28 must take at least some time, a repair lead time is associated with Repair operation 48. Where appropriate, the repair lead time may be considered the same for all Repair operations 48 and may be represented as a fixed number of days. For example, if parts 28 are repaired at time t=1, then with a one day repair lead time parts 28 would not be available for consumption at Good buffer 50a until time t=2. From USE buffer 44a, parts 28 may be produced into Good buffer 50a through a USE operation 54a. The lead time associated with USE operation 54a may equal zero. The inventory reflected in the buffer profile of Serviceable buffer 26a at a specified time equals the sum of the inventories reflected in the buffer profiles of Good buffer 50a and USE buffer 44a at the time.

In one embodiment, Good buffer 50a may procure serviceable parts 28 on demand from RTS buffer 32a through Repair operation 48a, from USE buffer 44a through USE operation 54a, or from Good buffer 50b of second repair location 22b through an appropriate Sourcing operation 56a. As described above, although only second repair location 22b is shown, Good buffer 50a may procure serviceable parts 28 from any suitable number of other repair locations 22 through any suitable sourcing operations 56. In a more particular embodiment, Good buffer 50a procures serviceable parts 28 according to a Procure operation 58a that encompasses Repair operation 48a, USE operation 54a, and Sourcing operation 56a and applies priorities to select a particular buffer 32a, 44a, or 50b from which to consume serviceable parts 28. Serviceable parts 28 are consumed from Serviceable buffer 26a to be put to service as replacement parts. The buffer profile for Good buffer 50 may be a determined for a specified time according to: (1) "beginning on hand" inventory including parts 28 within Good buffer 50 at the time, parts 28 in transit or otherwise approved for shipment from one or more upstream repair locations 22 or other upstream locations (e.g., reflected in approved move orders) at the time, and parts 28 undergoing or otherwise approved for repair (e.g., reflected in approved repair orders) at the time; and (2) outgoing inventory including parts 28 approved for shipment to one or more downstream repair locations 22 or other downstream locations (e.g., reflected in approved move orders) at the time.

FIG. 3 illustrates an example flow of unserviceable parts 28 through a series of repair locations 22 in a repair network. In this simple example, one hundred unserviceable parts 28 enter the Uninspected buffer 30a of first repair location 22a. According to the Inspection operation at first repair location 22a, twenty parts 28 are assigned an RTS condition state and placed in RTS buffer 32a according to the RTS rate of 0.2, thirty parts 28 are assigned an NRTS condition state and placed in NRTS buffer 36a according to the NRTS rate of 0.3, thirty parts 28 are assigned a COND condition state and placed in COND buffer 40a according to the COND rate of 0.3, and twenty parts 28 are assigned a USE condition state and placed in USE buffer 44a according to the USE rate of 0.2. The thirty parts 28 in NRTS buffer 36a of first repair location 22a are moved through an appropriate Sourcing operation 52a to the Uninspected buffer 30b of second repair location 22b. According to the Inspection operation at second repair location 22b, fifteen parts 28 are assigned an RTS condition state and placed in RTS buffer 32b according to the RTS rate of 0.5, twelve parts 28 are assigned an NRTS condition state and placed in NRTS buffer 36b according to the NRTS rate of 0.4, zero parts 28 are assigned a COND condition state and placed in COND buffer 40b according to the COND rate of 0.0, and three parts 28 are assigned a USE condition state and placed in USE buffer 44b according to the USE rate of 0.1. The twelve parts 28 in NRTS buffer 36b of first repair location 22a are moved through an appropriate Sourcing operation 52b to the Uninspected buffer 30c of third repair location 22c. According to the Inspection operation at third repair location 22c, ten parts 28 are assigned an RTS condition state and placed in RTS buffer 32c according to the RTS rate of 0.8, zero parts 28 are assigned an NRTS condition state and placed in NRTS buffer 36c according to the NRTS rate of 0.0, two parts 28 are assigned a COND condition state and placed in COND buffer 40c according to the COND rate of 0.2, and zero parts 28 are assigned a USE condition state and placed in USE buffer 44c according to the USE rate of 0.0. In one embodiment, replenishment planning engine 16 may implement appropriate rounding logic to ensure that, as in reality, there are integral quantities of parts 28 in each condition state at each repair location 22.

In one embodiment, as discussed above, each Sourcing operation 52 may be implemented according to a reverse BOD and an associated move order according to which unserviceable parts 28 are pushed upstream from one repair location 22 to another repair location 22. As an example and without limitation, using the simple example illustrated in FIG. 3, move orders may be specified as follows:

| From Loc ID | From Item ID | To Loc ID | To Item ID | Transport Mode | Shipment Date | Delivery Date | Quantity |
|---|---|---|---|---|---|---|---|
| 22a | P_Core | 22b | P_Core | REVERSE_BOD | 1 | 2 | 30 |
| 22b | P_Core | 22c | P_Core | REVERSE_BOD | 3 | 4 | 12 |

Assuming unserviceable parts 28 arrive at the Uninspected buffer 30a of first repair location 22a at time t=0, the movement of the thirty NRTS parts 28 into NRTS buffer 36a through the Inspect NRTS sub-operation 38a begins after the disposition time associated with the Inspection operation has elapsed. If the disposition time is equal to one time unit, then the movement of the thirty NRTS parts 28 from NRTS buffer 36a of first repair location 22a to Uninspected buffer 30b of second repair location 22b will begin at time t=1. If the reverse BOD move lead time associated with a first move order from first repair location 22a to second repair location 22b is equal to one time unit, then the thirty NRTS parts 28 from first repair location 22a will arrive at second repair location 22b at time t=2. The thirty NRTS parts 28 from first repair location 22a are again subject to the disposition time associated with the Inspection operation at second repair location 22b. If the disposition time is again equal to one time unit, then the movement of the twelve NRTS parts 28 from NRTS buffer 36b of second repair location 22b to Uninspected buffer 30c of third repair location 22c will begin at time t=3. If the reverse BOD move lead time associated with a second move order from second repair location 22b to third repair location 22b is equal to one time unit, then the twelve NRTS parts 28 from second repair location 22b will arrive at third repair location 22c at time t=4.

Referring again to FIG. 2, in one embodiment, replenishment planning engine 16 performs a first push planning phase in which unserviceable parts 28 are first pushed from Uninspected buffer 30 of each repair location 22 to RTS buffer 32, NRTS buffer 36, COND buffer 40, and USE buffer 44 of each repair location 22 and then pushed from NRTS buffer 36 of each repair location 22 to destination buffers of one or more other repair locations 22 in the repair network. In general, in the first push planning phase, for each unserviceable part 28 at each repair location 22, replenishment planning engine 16 may estimate the earliest time at which a Repair operation 48 can begin for part 28 at that or another repair location 22 and thus the earliest time at which, after part 28 has been repaired, serviceable part 28 can be available to be put to service to satisfy demand at that repair location 22. This may allow replenishment planning engine 16 to estimate based on forecasted demand, within a second pull planning phase described more fully below, the latest time at which to repair each part 28 and thus the time at which to generate a repair order for each part 28, enabling on-demand repair planning.

Parts 28 are pushed from Uninspected buffer 30 to RTS buffer 32, NRTS buffer 36, COND buffer 40, and USE buffer 44 according to the corresponding RTS, NRTS, COND, and USE rates. As described above, the disposition time for the Inspection operation must elapse before parts 28 may be placed into buffers 32, 36, 40, 44. Unserviceable parts 28 are then pushed upstream from NRTS buffer 36 to Uninspected buffers 30 (possibly to RTS buffers 32 or NRTS buffers 36 instead of or in addition to Uninspected buffers 30) of one or more other repair locations 22 according to reverse BODs and associated move orders. As described above, the associated move lead time must elapse before parts 28 may be placed into a destination buffer of the other repair location 22. After parts 28 are repaired at another repair location 22, one or more move lead times must elapse before these repaired parts 28 reach the repair location 22 from which these parts 28 entered the repair network and are available to be put to service to satisfy demand at the repair location 22.

Figure 4:
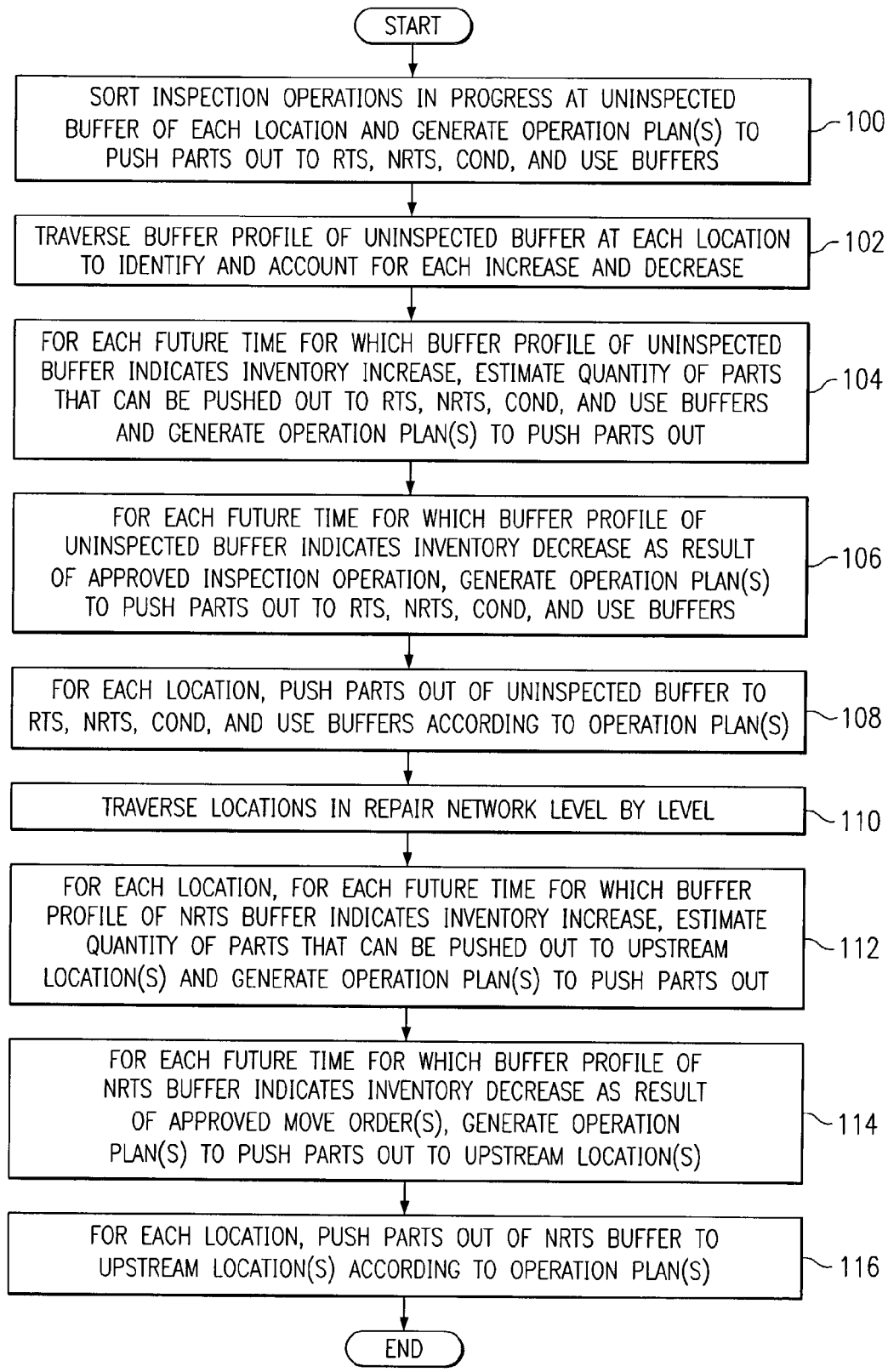
FIG. 4 illustrates an example push planning phase of a repair planning process.

FIG. 4 illustrates an example push planning phase of a repair planning process. In a first general step of the first push planning phase, the replenishment planning engine 16 pushes unserviceable parts 28 in Uninspected buffer 30 of each repair location 22 out to RTS buffer 32, NRTS buffer 36, COND buffer 40, and USE buffer 44 of repair location 22. The first general step may be performed periodically in a series of iterations. In a second general step of the first push planning phase, the replenishment planning engine 16 pushes unserviceable parts 28 from NRTS buffers 36 of each repair location 22 to Uninspected buffers 30 (possibly to RTS buffers 32 or NRTS buffers 36 instead of or in addition to Uninspected buffers 30) of one or more upstream repair locations 22 according to corresponding reverse BODs. The second general step may also be performed periodically in a series of iterations. In one embodiment, for a particular planning cycle, all iterations of the first general step are performed before any iterations of the second general step may begin. However, iterations within each step may overlap. For example, replenishment planning engine 16 may perform a second iteration of the first general step that overlaps in whole or in part with a first iteration of the first general step. Example overlap rules for the second general step are described more fully below in connection with step 112.

In one embodiment, to push unserviceable parts 28 in Uninspected buffer 30 of each repair location 22 out to RTS buffer 32, NRTS buffer 36, COND buffer 40, and USE buffer 44 of repair location 22 in the first general step of the first push planning phase, at step 100 replenishment planning engine 16 sorts the Inspection operations that are in-progress at Uninspected buffer 30 of each repair location 22 and generates operation plans for Inspect RTS sub-operation 34, Inspect NRTS sub-operation 38, Inspect COND sub-operation 42, and Inspect USE sub-operation 46 that produce parts 28 into RTS buffer 32, NRTS buffer 36, COND buffer 40, and USE buffer 44, respectively, according to the RTS, NRTS, COND, and USE rates, respectively. In-progress Inspection operations may be sorted according to the time at which the Inspection operations will complete, in-progress Inspection operations completing earlier being placed before in-progress Inspection operations completing later. An Inspection operation may be considered in-progress if it has begun before the current time under consideration and the disposition time will elapse after the current time under consideration. For example, if the current time under consideration is today, an unserviceable part 28 arrived at Uninspected buffer 30 yesterday, and the disposition time is two days, then the Inspection operation with respect to part 28 may be considered in-progress since the Inspection operation will complete tomorrow. Because each Inspection operation is associated with one or more parts 28, sorting Inspection operations in time may be equivalent to sorting parts 28 in time according to when the associated Inspection operations will complete. This sorting is performed such that parts 28 for which the Inspection operation will complete sooner are processed before other parts 28 for which the Inspection operation will complete later. As described above, an operation plan may specify a start time, an end time (i.e. the start time plus the lead time for the operation), a quantity of parts 28 (i.e. determined according to the rate for the operation), a buffer from which parts 28 are being consumed, and a buffer into which parts 28 are being produced. For in-progress Inspection operations, associated parts 28 have already (i.e. before the current time) been consumed from Uninspected buffer 30 for inspection. Thus, these operation plans involve producing parts 28 into the destination buffers after inspection, but not consuming parts 28 from Uninspected buffer 30.

At step 102, replenishment planning engine 16 traverses the buffer profile of Uninspected buffer 30 of each repair location 22, identifying and accounting for each increase and decrease in the buffer profile. As described above, the buffer profile may be a determined for a specified time according to: (1) beginning on hand inventory including parts 28 within Uninspected buffer 30 at the time, parts 28 in transit or otherwise approved for shipment from one or more downstream repair locations 22 (e.g., reflected in approved move orders) and in an uninspected state at the time, actual returns for parts 28 (e.g., reflected in confirmed return requests) at the time, and forecasted demand for parts 28 (e.g., reflected in netted repair return forecasts) at the time; and (2) outgoing inventory including parts 28 approved for inspection at the time.

Parts 28 within Uninspected buffer 30 are in an uninspected state (i.e. the Inspection operation has not yet completed for these parts 28). In one embodiment, steps 104 and 106 are performed for each in-progress Inspection operation based on the sorting performed at step 100, such that steps 104 and 106 for an in-progress Inspection operation may overlap in part with steps 104 and 106 for a subsequent in-progress Inspection operation. At step 104, for each future time for which the buffer profile of Uninspected buffer 30 indicates an inventory increase (i.e. parts 28 produced into Uninspected buffer 30), replenishment planning engine 16 estimates the quantity of parts 28 that can be acceptably pushed out of Uninspected buffer 30 through the Inspection operation to one or more of RTS buffer 32, NRTS buffer 36, and USE buffer 44 and generates corresponding operation plans for Inspect RTS sub-operation 34, Inspect NRTS sub-operation 38, Inspect COND sub-operation 42, and Inspect USE sub-operation 46, respectively, according to the RTS, NRTS, COND, and USE rates, respectively. These operation plans involve both consuming parts 28 from Uninspected buffer 30 and producing parts 28 into the destination buffers after inspection. The quantity of parts 28 that can be acceptably pushed out of Uninspected buffer 30 may be the quantity that can be pushed out without causing a situation in which an approved Inspection operation, for a specified quantity of parts 28 at a specified time in the future, cannot take place because there are insufficient parts 28 within Uninspected buffer 30 for the approved Inspection operation to take place at the specified time in the future. For example, if ten parts 28 arrived at Uninspected buffer 30 at time t=0, then replenishment planning engine 16 will estimate upon traversing the buffer profile at time t=0 that all ten parts 28 can be pushed out of Uninspected buffer 30. However, if a future approved Inspection operation for five parts 28 is scheduled for time t=4, all ten parts 28 are inspected at time t=0, and there is no incoming inventory in the meantime, then the future approved inspection scheduled for time t=4 cannot actually take place. Thus, in this particular example, a maximum of five parts 28 can be pushed out of Uninspected buffer 30 at time t=0.

At step 106, for each future time for which the buffer profile of Uninspected buffer 30 indicates an inventory decrease as a result of an approved Inspection operation (i.e. parts 28 consumed from Uninspected buffer 30), replenishment planning engine 16 generates operation plans, ending at the time specified in the approved inspection, for Inspect RTS sub-operation 34, Inspect NRTS sub-operation 38, Inspect COND sub-operation 42, and Inspect USE sub-operation 46 suitable for pushing parts 28 out of Uninspected buffer 30 to RTS buffer 32, NRTS buffer 36, COND buffer 40, and USE buffer 44, respectively, according to the RTS, NRTS, COND, and USE rates, respectively. Operation plans associated with Uninspected buffers 30 may be generated in any appropriate order. Like the operation plans described above in connection with step 100, these operation plans involve producing parts 28 into the destination buffers after inspection, but not consuming parts 28 from Uninspected buffer 30. In one embodiment, appropriate rounding logic may be applied to ensure that, as in reality, integral quantities of parts 28 are moved to each buffer 32, 36, 40, 44. In a more particular embodiment, a raw operation plan is generated for each sub-operation 34, 38, 42, 46, which may specify a non-integral quantity of parts 28 for sub-operation 34, 38, 42, 46 according to the corresponding rates. Based on application of rounding logic, a final operation plan may then be generated for each sub-operation 34, 38, 42, 46 that specifies an integral quantity of parts 28 for sub-operation 34, 38, 42, 46. At step 108, for each repair location 22, replenishment planning engine 16 pushes appropriate parts 28 out of Uninspected buffer 30 to RTS buffer 32, NRTS buffer 36, COND buffer 40, and USE buffer 44 according to the corresponding operation plans.

At step 110, in one embodiment, replenishment planning engine 16 traverses repair locations 22 in the repair network level by level, starting with the most downstream repair locations 22 and moving upstream. In one example, this involves traversing all downstream repair locations 22 (e.g., at the level of first repair location 22a in FIG. 3), then traversing all repair locations 22 in the next upstream level (e.g., at the level of second repair location 22b in FIG. 3), then traversing all repair locations 22 in the next upstream level (e.g., at the level of third repair location 22c in FIG. 3), and so on. The manner in which repair locations 22 are traversed may, in certain embodiments, depend on one or more other considerations.

In one embodiment, step 112 is performed for each repair location 22 as it is reached during the traversal of step 110. In addition, in one embodiment, steps 112 and 114 are not necessarily performed sequentially, such that steps 112 and 114 may in general overlap according to the buffer profile of NRTS buffer 36. At step 112, for a repair location 22 traversed in step 110, for each future time for which the buffer profile of NRTS buffer 36 indicates an inventory increase (i.e. parts 28 produced into NRTS buffer 36 from Uninspected buffer 30 according to Inspect NRTS sub-operation 38), replenishment planning engine 16 estimates the quantity of parts 28 that can be acceptably pushed out of NRTS buffer 36 through one or more Sourcing operations 52 to one or more upstream repair locations 22 and generates corresponding operation plans for Sourcing operations 52 accordingly. As described above, an operation plan may specify a start time, an end time (i.e. the start time plus the transit time for the move), a quantity of parts 28 being moved (i.e. determined according to the NRTS rate), a repair location 22 from which parts 28 are being moved, and a repair location 22 to which parts 28 are being moved. These operation plans involve both consuming parts 28 from NRTS buffer 36 and producing parts into the destination buffers of upstream repair locations 22. The quantity of parts 28 that can be acceptably pushed out may be the quantity that can be pushed out without causing a situation in which a future approved Move operation cannot take place because there are insufficient parts 28 within NRTS buffer 36 for the approved Move operation at the time the approved Move operation is scheduled to occur. For example, if ten parts 28 arrived at NRTS buffer 36 at time t=1, replenishment planning engine 16 will estimate upon traversing the buffer profile at time t=1 that ten parts 28 can be pushed out of NRTS buffer 36. However, if a future approved Move operation for five parts 28 is scheduled for time t=5, all ten parts 28 are moved out at time t=1, and there is no incoming inventory in the meantime, then the approved move scheduled for time t=5 cannot actually take place. Thus, in this particular example, a maximum of five parts 28 can be pushed out of NRTS buffer 36 at time t=1. Where repair locations 22 in the repair network are traversed level by level as described above, performance of step 112 for a repair location 22 may overlap in whole or in part with performance of step 112 for one or more other repair locations 22 in the same level, but step 112 is performed for all repair locations 22 in a level before step 112 is performed for any repair location 22 in another level upstream of that level.

At step 114, for each future time for which the buffer profile of NRTS buffer 36 indicates an inventory decrease as a result of one or more approved Move orders to one or more upstream repair locations 22 (i.e., parts 28 consumed from NRTS buffer 36), replenishment planning engine 16 generates one or more operation plans for the one or more corresponding Sourcing operations 52, which may involve one or more associated reverse BODs. These operation plans involve producing parts 28 into the destination buffers after Sourcing operation 52 has completed, but not consuming parts 28 from NRTS buffer 36. Where parts 28 may be pushed out of NRTS buffer 36 to multiple upstream repair locations 22 based on the NRTS rates defined on the associated reverse BODs, appropriate rounding logic may be applied to ensure that, as in reality, integral quantities of parts 28 are moved to each such repair location 22. In a more particular embodiment, a raw operation plan is generated for each Sourcing operation 52, which may specify a non-integral quantity of parts 28 for Sourcing operation 52 according to the corresponding NRTS rate. Based on application of rounding logic, a final operation plan may then be generated for each Sourcing operation 52 that specifies an integral quantity of parts 28 for Sourcing operation 52. At step 116, for each repair location 22, replenishment planning engine 16 pushes appropriate parts 28 out of NRTS buffer 36 to Uninspected buffers 30 (possibly to RTS buffers 32 or NRTS buffers 36 instead of or in addition to Uninspected buffers 30) of one or more upstream repair locations 22 according to the corresponding operation plans generated at step 114. Steps 114 and 116 may be performed level by level in the same manner described above with respect to step 112.

Referring again to FIG. 2, in one embodiment, replenishment planning engine 16 performs a second pull planning phase in which replenishment planning engine 16 generates on-demand or just-in-time operation plans for RTS operation 34, USE operation 46, and Sourcing operation 56 at each repair location 22 based on demand forecasts for each repair location 22 obtained from forecasting engine 12. Instead of merely using Sourcing operation 56 to procure serviceable parts 28 to meet forecasted demand at a repair location 22, replenishment planning engine 16 attempts to pull serviceable parts 28 first from USE buffer 44 through USE operation 54 from USE buffer 44 at repair location 22. If the quantity or time of availability of serviceable parts 28 in USE buffer 44 is not sufficient to satisfy forecasted demand, then as a second option replenishment planning engine 16 attempts to pull serviceable parts 28 from RTS buffer 32 through Repair operation 54 at repair location 22. If the quantity or time of availability of serviceable parts 28 in USE buffer 44 or available from RTS buffer 32 through Repair operation 54 is not sufficient to satisfy forecasted demand, then as a third option replenishment planning engine 16 attempts to pull serviceable parts 28 from the Good buffers 50 of one or more other repair locations 22 or other locations through one or more associated Sourcing operations 56. If the quantity or time of availability of serviceable parts 28 available through USE operation 54, Repair operation 48, and one or more Sourcing operations 56 is not sufficient to satisfy forecasted demand at repair location 22, then as a final option replenishment planning engine 16 may need to short the demand or, if one or more upstream vendor locations are defined, initiate procurement of serviceable parts 28 from one or more vendors in a traditional manner.

Although a particular priority sequence is described above with respect to procurement of serviceable parts 28, the present invention contemplates any suitable priority sequence being used. For example, to satisfy forecasted demand at repair location 22 for a first part 28a for which a second part 28b may be substituted, it may be desirable in one environment to procure serviceable parts 28 according to the sequence: (1) first parts 28a at repair location 22 on hand or through USE operation 54; (2) second parts 28b at repair location 22 on hand or through USE operation 54; (3) first parts 28a from one or more upstream repair locations 22 through Sourcing operations 56; (4) second parts 28b from one or more upstream repair locations 22 through Sourcing operations 56; (5) first parts 28a at repair location 22 through Repair operation 48; (6) second parts 28b at repair location 22 through Repair operation 48; (7) first parts 28a from one or more vendors in traditional manner; and (8) second parts 28b from one or more vendors in traditional manner. As another example, it may be desirable in another environment to instead procure serviceable parts 28 according to the sequence: (1) first parts 28a at repair location 22 on hand or through USE operation 54; (2) first parts 28a from one or more upstream repair locations 22 through Sourcing operations 56; (3) first parts 28a at repair location 22 through Repair operation 48; (4) second parts 28b at repair location 22 on hand or through USE operation 54; (5) second parts 28b from one or more upstream repair locations 22 through Sourcing operations 56; (6) second parts 28b at repair location 22 through Repair operation 48; (7) first parts 28a from one or more vendors in traditional manner; and (8) second parts 28b from one or more vendors in traditional manner. As a further example, it may be desirable to attempt to satisfy forecasted demand at repair location 22 through procurement of serviceable parts 28 from USE buffer 44 of an upstream repair location 22 that is more than one level removed from the repair location 22 at which the forecasted demand exists, before attempting to procure serviceable parts 28 through Repair operation 48 at the repair location 22 at which the forecasted demand exists. Replenishment planning engine 16 may consider any appropriate prioritization scheme in generating operation plans in an effort to satisfy forecasted demand at each repair location 22. In one embodiment, a user of system 10 may be able to select or otherwise specify a sourcing sequence for each part 28 for each repair location 22.

Example operation of the second pull planning phase may be described using the simple example of FIG. 3 discussed above. Assume a demand at time t=5 of eighty serviceable parts 28 at first repair location 22a. Also assume that Uninspected buffer 30a of first repair location 22a contains one hundred unserviceable parts 28 at time t=0. Also assume the disposition time for each Inspection operation is one unit of time, the repair lead time associated with Repair operation 48 is one unit of time, and the move lead time for each movement between repair locations 22 (whether a forward BOD or reverse BOD) is also one unit of time. Based on replenishment planning engine 16 pushing unserviceable parts 28 within first repair location 22a, from first repair location 22a to second repair location 22b, within second repair location 22b, from second repair location 22a to third repair location 22c, and within third repair location 22c described above, the quantities of parts 28 in each condition state at each repair location 22 is as follows:

| Location | RTS | NRTS | COND | USE |
|---|---|---|---|---|
| 22a | 20 | 30 | 30 | 20 |
| 22b | 15 | 12 | 0 | 3 |
| 22c | 10 | 0 | 2 | 0 |

Figure 5A:
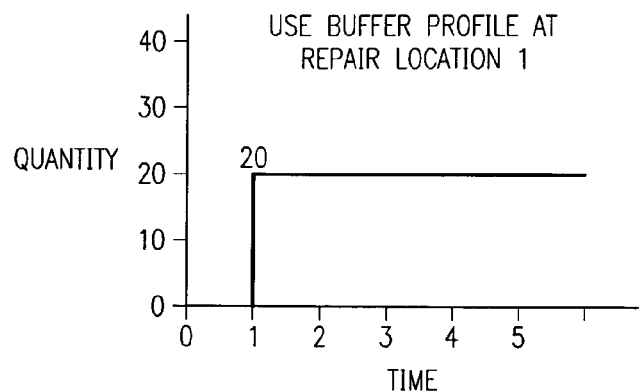
FIGS. 5A-5F illustrate example buffer profiles.
Figure 5B:
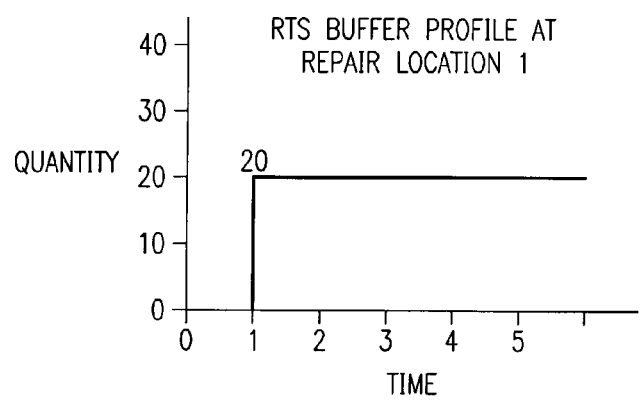

Thus, of the one hundred unserviceable parts 28 received at first repair location 22a and placed in Uninspected buffer 30a at time t=0, only the twenty parts 28 in USE buffer 44a are available to satisfy the demand at first repair location 22a at time t=1 (after the disposition time associated with the Inspection operation at first repair location 22a has elapsed). The profile of USE buffer 44a (i.e. the on-hand inventory of serviceable parts 28 at first repair location 22a) for this example is illustrated in FIG. 5A. The twenty unserviceable parts 28 in RTS buffer 32a of first repair location 22a are available for repair at time t=1 and thus cannot be available to satisfy the demand at first repair location 22a until time t=2 at the earliest (after the added repair lead time for Repair operation 48a). The profile of RTS buffer 32a for this example is illustrated in FIG. 5B.

Figure 5C:
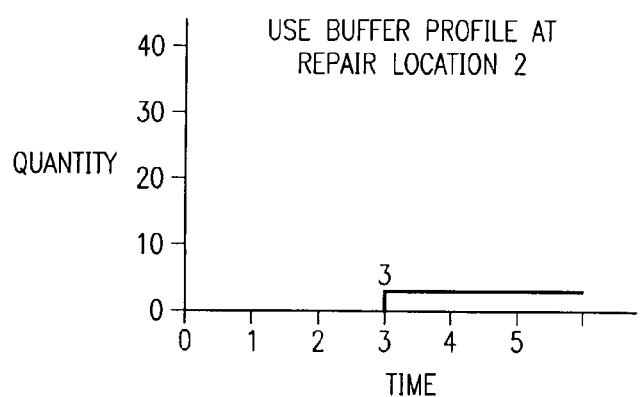
Figure 5D:
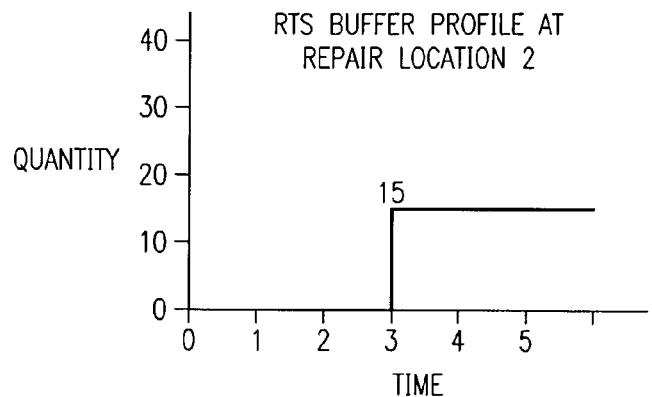

Analogously, of the thirty unserviceable parts 28 received at second repair location 22b and placed in Uninspected buffer 30b at time t=2 (after the added move lead time for the reverse BOD from first repair location 22a to second repair location 22b), only the three parts 28 in USE buffer 44b are available at time t=3 (after the added disposition time for the Inspection operation at second repair location 22b) and cannot be available to satisfy demand at first repair location 22a until time t=4 (after the added move lead time for the forward BOD from second repair location 22b back to first repair location 22a). The profile of USE buffer 44b for this example is illustrated in FIG. 5C. The fifteen unserviceable parts 28 in RTS buffer 32b of second repair location 22b are available for repair at time t=3 (after the added disposition time for the Inspection operation at second repair location 22b) and thus cannot be available to satisfy demand at first repair location 22a until time t=5 at the earliest (after the added repair lead time for Repair operation 48b and also the added move lead time for the forward BOD from second repair location 22b back to first repair location 22a). The profile of RTS buffer 32b for this example is illustrated in FIG. 5D.

Figure 5E:
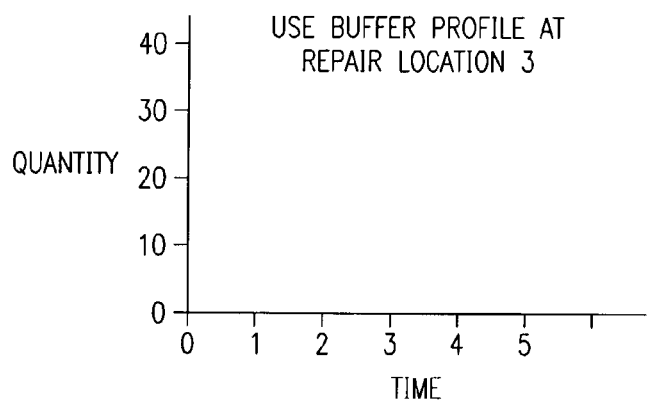
Figure 5F:
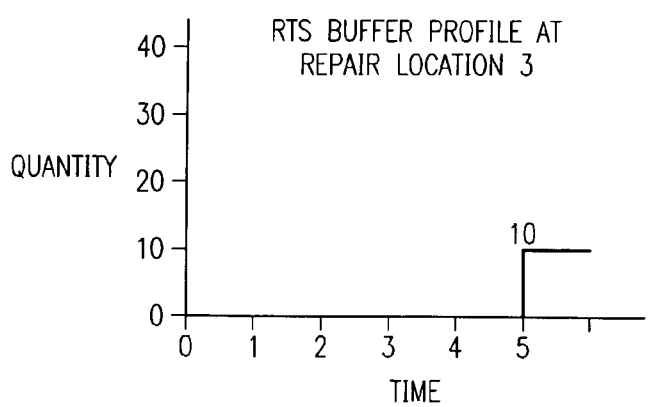

Analogously, of the twelve unserviceable parts 28 received at third repair location 22c and placed in Uninspected buffer 30c at time t=4 (after the added move lead time for the reverse BOD from second repair location 22b to third repair location 22c), USE buffer 44c contains zero parts 28 at time t=5 (after the added disposition time for the Inspection operation at third repair location 22c). The profile of USE buffer 44c for this example is illustrated in FIG. 5E. The ten unserviceable parts 28 in RTS buffer 32c of third repair location 22c are available for repair at time t=5 (after the added disposition time for the Inspection operation at third repair location 22c) and thus cannot be available to satisfy demand at first repair location 22a until time t=8 at the earliest (after the added repair lead time for Repair operation 48c and also the two added move lead times for the forward BODs from third repair location 22c back to second repair location 22b and from second repair location 22b back to first repair location 22a). The profile of RTS buffer 32c for this example is as illustrated in FIG. 5F.

In one embodiment, based on the demand at time t=5 of eighty serviceable parts 28 at first repair location 22a and a goal of waiting as long as possible to repair or move parts 28, replenishment planning engine 16 may partially satisfy the demand as follows:

| Loc | RTS | USE | Demand | Fulfillment/ Repair | Unfulfilled | Fulfillment Time | Balance Repair Potential | Repair Start Time | Repair End Time |
|-----|-----|-----|--------|---------------------|-------------|------------------|--------------------------|-------------------|-----------------|
| 22a |     | 20  | 80     | 20                  | 60          | 5                |                          |                   |                 |
| 22a | 20  |     | 60     | 20                  | 40          | 5                | 0                        | 4                 | 5               |
| 22b |     | 3   | 40     | 3                   | 37          | 4                |                          |                   |                 |
| 22b | 15  |     | 37     | 15                  | 22          | 5                | 0                        | 3                 | 4               |
| 22c |     | 0   | 22     | 0                   | 22          |                  |                          |                   |                 |
| 22c | 10  |     | 22     | 0                   | 22          |                  |                          |                   |                 |

The repair orders in this example are:

| Repair Order ID | From Item ID | To Item ID | Loc Id | Start Date | End Date | Quantity |
|-----------------|--------------|------------|--------|------------|----------|----------|
| 0               | P_Core       | P          | 22a    | 4          | 5        | 20       |
| 1               | P_Core       | P          | 22b    | 3          | 4        | 15       |

In planning to satisfy the demand at time t=5 of eighty serviceable parts 28 at first repair location 22a, replenishment planning engine 16 estimates that there are twenty parts 28 on-hand in USE buffer 44a beginning at time t=1 and that twenty parts 28 in RTS buffer 32a can be repaired at any time between time t=1 (the earliest time at which these parts 28 can be repaired to satisfy any demand) and time t=4 (the latest time at which these parts 28 can be repaired to satisfy a demand at time t=5).

Thus, a total of forty parts 28 from first repair location 22a itself can be available to satisfy the demand at time t=5. According to the present invention, replenishment planning engine 16 plans a repair order for the twenty parts 28 in RTS buffer 32a at time t=4, which is as late as possible in this example. Considering second repair location 22b, replenishment planning engine 16 estimates that there is a remaining demand at time t=5 at first repair location 22a for forty parts 28, that three parts 28 on-hand in USE buffer 44b can be moved back to first repair location 22a at any time between time t=3 (the earliest time at which these parts 28 can be moved to satisfy any demand) and time t=4 (the latest time at which these parts 28 can be moved to satisfy a demand at time t=5 at first repair location 22a), and that fifteen parts 28 in RTS buffer 32b can be repaired at time t=3 (the earliest time at which these parts 28 can be repaired to satisfy any demand and also the latest time at which these parts 28 can be repaired to satisfy a demand at time t=5 at first repair location 22a). Thus, a total of eighteen parts 28 from second repair location 22b can be available to satisfy the demand at time t=5 at first repair location 22a. According to the present invention, replenishment planning engine 16 plans a repair order for the fifteen parts 28 in RTS buffer 32b at time t=3 and a move order for the three parts 28 in USE buffer 44b and the fifteen parts 28 in RTS buffer 32b (after they have been repaired) at time t=4, both of which are as late as possible in this example.

Finally, considering third repair location 22c, replenishment planning engine 16 estimates that there is a remaining demand at time t=5 at first repair location 22a for twenty-two parts 28, that zero parts 28 are on-hand in USE buffer 44c, and that the ten parts 28 in RTS buffer 32c cannot be repaired until time t=5 (which is past the latest time t=3 at which these parts 28 could be repaired to satisfy a demand at time t=5 at first repair location 22a). Thus, zero parts 28 from third repair location 22b can be available to satisfy the demand at time t=5 at first repair location 22a. According to the present invention, replenishment planning engine 16 plans no move or repair order for parts 28 at third repair location 22c in this example. Since only fifty-eight parts 28 can be made available to satisfy the demand at time t=5 at first repair location 22a for eighty parts 28, replenishment planning engine 16 may short the demand or, if there exists a vendor location defined upstream of first repair location 22a, plan a purchase order for twenty-two parts 28 to meet the shortfall.

In one embodiment, in addition to planning repair orders and move orders as appropriate to provide on-demand repair planning, replenishment planning engine 16 may automatically approve planned repair orders and planned move orders satisfying predefined constraints. As an example, users of system 10 may be allowed to define one or more constraints applicable to repair orders based on repair lead times, repair costs, and other appropriate factors. Similarly, users of system 10 may be allowed to define one or more constraints applicable to move orders based on move lead times, shipping costs, and other appropriate factors. Replenishment planning engine 16 may then automatically approve all planned repair orders and move orders satisfying the applicable predefined constraints, independent of human interaction. Planned repair orders and move orders not satisfying the applicable predefined constraints could be sorted out on an exception basis for human approval. Such automatic approval may further improve the repair planning process by improving speed and accuracy while reducing time and manpower requirements.

Figure 6A:
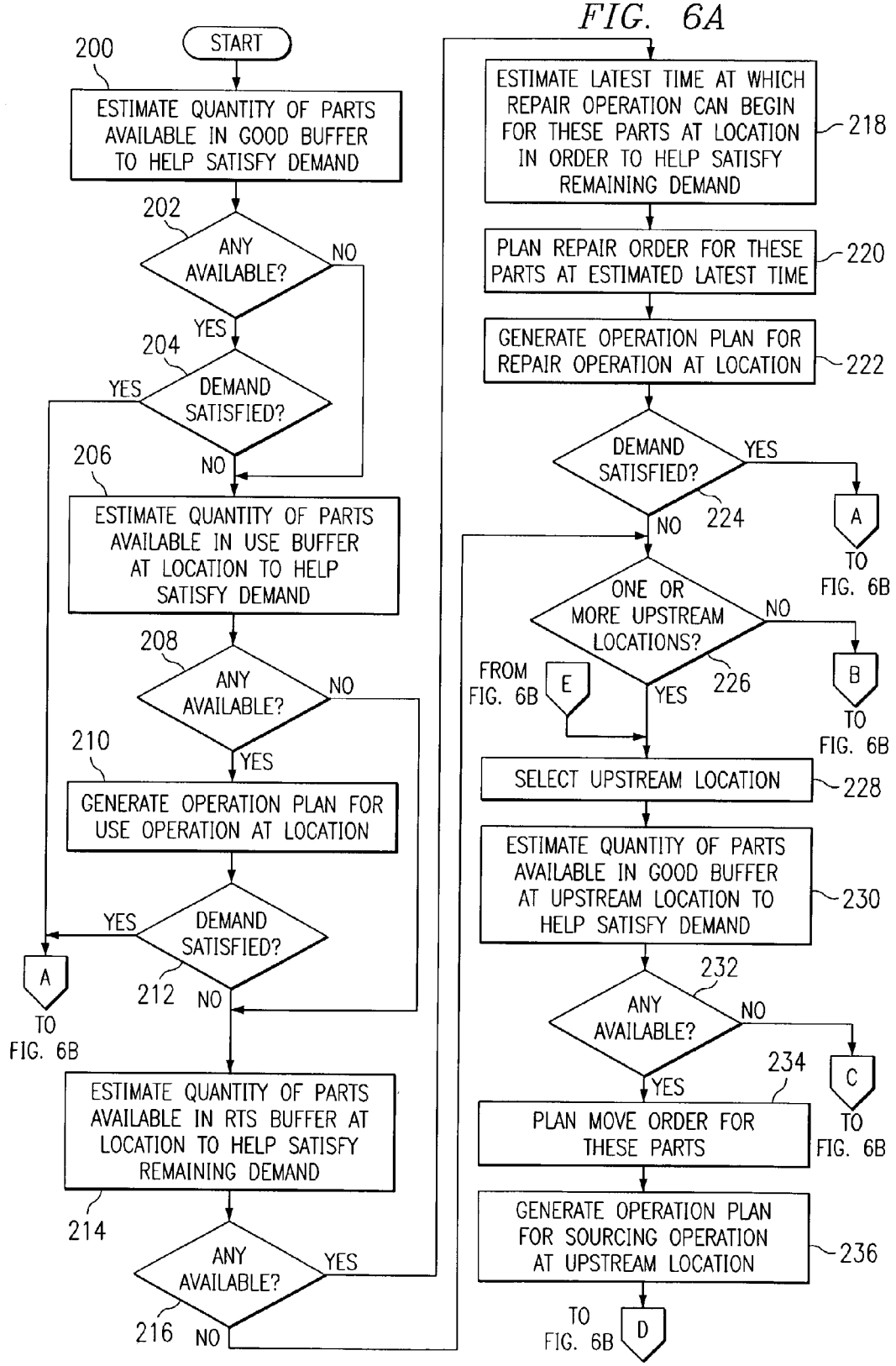

FIGS. 6A and 6B illustrate an example pull planning phase of a repair planning process. In summary, in one embodiment, to satisfy a demand for serviceable parts 28 at repair location 22, replenishment planning engine 16 pulls serviceable parts 28 to Good buffer 50 of repair location 22 from USE buffer 44 of repair location 22, from RTS buffer 32 of repair location 22, from Good buffers 50 of one or more upstream repair locations 22, or using traditional procurement operations. In general, to be available to help satisfy the demand, parts 28 must be in Good buffer 50 of repair location 22 at the time of the demand or earlier, considering all the disposition times, repair lead times, and move lead times that may need to be incurred in doing so. At step 200, replenishment planning engine 16 estimates the quantity of parts 28 available in Good buffer 50 of repair location 22 to help satisfy the demand. If no parts 28 are available at step 202, then replenishment planning engine 16 proceeds to step 206. However, if any parts 28 are available at step 202 and these parts 28 are sufficient to fully satisfy the demand at step 206, then the pull planning phase is complete as to the demand.

If the demand is not fully satisfied at step 204, then at step 206 replenishment planning engine 16 estimates the quantity of parts 28 available in USE buffer 44 of repair location 22 to help satisfy the demand. If no parts 28 are available at step 208, then replenishment planning engine 16 proceeds to step 214. However, if any parts 28 are available at step 208, then at step 210 replenishment planning engine 16 generates an appropriate operation plan for USE operation 54 for these parts 28 at repair location 22. If USE operation 54 has a non-zero lead time, then the operation plan may need to take this into account to ensure that these parts 28 are available to help satisfy the remaining demand. If the demand is fully satisfied at step 212, then the pull planning phase is complete as to the demand. However, if the demand is not satisfied at step 212, then at step 214 replenishment planning engine 16 estimates the quantity of parts 28 available in RTS buffer 32 of repair location 22 to help satisfy the remaining demand. If no parts 28 are available at step 216, then replenishment planning engine 16 proceeds to step 226. However, if any parts 28 are available at step 216, then at step 218 replenishment planning engine 16 preferably estimates the latest time at which Repair operation 48 can begin for these parts 28 at repair location 22 in order to help satisfy the remaining demand. Replenishment planning engine 16 plans a repair order for these parts 28 at the estimated latest time at step 220 and, at step 222, generates an appropriate operation plan for Repair operation 48 at repair location 22.

If the demand is fully satisfied at step 224, then the pull planning phase is complete as to the demand. If the demand is not fully satisfied at step 224 and no upstream repair locations 22 exist from which serviceable parts 28 might be procured to help satisfy the remaining demand at step 226, then replenishment planning engine 16 may proceed to step 268 for procurement of parts 28 in a traditional manner to satisfy the remaining demand. If the remaining demand cannot be satisfied in this manner given lead time constraints, then the demand is shorted. However, if one or more appropriate upstream repair locations 22 exist at step 226, then replenishment planning engine 16 selects an upstream repair location 22 at step 228. At step 230, replenishment planning engine 16 estimates the quantity of parts 28 available in Good buffer 50 of upstream repair location 22 to help satisfy the demand. If no parts 28 are available at step 232, then replenishment planning engine 16 proceeds to step 238. However, if any parts 28 are available at step 232, then replenishment planning engine 16 plans a move order (and any associated forward BOD) for these parts 28 at step 234 and, at step 236, generates an appropriate operation plan for Sourcing operation 56 at upstream repair location 22. The move order may be planned at an estimated latest time at which Sourcing operation 56 can begin for these parts 28 at upstream repair location 22 in order to help satisfy the remaining demand.

If the demand is fully satisfied at step 238, then the pull planning phase is complete as to the demand. However, if the demand is not fully satisfied at step 238, then at step 240 replenishment planning engine 16 estimates the quantity of parts 28 available in USE buffer 44 of upstream repair location 22 to help satisfy the remaining demand. If no parts 28 are available at step 242, then replenishment planning engine 16 proceeds to step 268. However, if any parts 28 are available at step 242, then at step 244 replenishment planning engine 16 preferably estimates the latest time at which USE operation 54 can begin for these parts 28 at upstream repair location 22 in order to help satisfy the remaining demand. If USE operation 54 has a non-zero lead time, then the latest time estimate may need to take this into account. Replenishment planning engine 16 plans a move order (and any associated forward BOD) for these parts 28 at the estimated latest time plus any non-zero lead time for USE operation 54 at step 246 and, at step 248, generates appropriate operation plans for USE operation 54 and Sourcing operation 56 at upstream repair location 22.

If the demand is fully satisfied at step 250, then the pull planning phase is complete as to the demand. However, if the demand is not fully satisfied at step 250, then at step 252 replenishment planning engine 16 estimates the quantity of parts 28 available in RTS buffer 32 of upstream repair location 22 to help satisfy the remaining demand. If no parts 28 are available at step 254, then replenishment planning engine 16 proceeds to step 266. However, if any parts 28 are available at step 254, then at step 256 replenishment planning engine 16 preferably estimates the latest time at which Repair operation 48 can begin for these parts 28 at upstream repair location 22 in order to help satisfy the remaining demand. Replenishment planning engine 16 plans a repair order for these parts 28 at the estimated latest time at step 258, plans a corresponding move order (and any associated forward BOD) at the estimated latest time plus the repair lead time for these parts 28 at step 258 and, at step 262, generates appropriate operation plans for Repair operation 48 and Sourcing operation 56 at upstream repair location 22.

If the demand is fully satisfied at step 264, then the pull planning phase is complete as to the demand. However, if the demand is not fully satisfied at step 264, and one or more other appropriate upstream repair locations 22 exist at step 266, then replenishment planning engine 16 returns to step 228 for selection of an appropriate upstream repair location 22 and the pull planning phase proceeds as to the selected upstream repair location 22 in the manner described above. The pull planning phase may continue analogously until no appropriate upstream repair locations 22 exist at step 266, in which case replenishment planning engine 16 may attempt to procure parts 28 from a vendor in a traditional manner to satisfy the remaining demand at step 268. If the remaining demand cannot be satisfied in this manner given lead time constraints, the demand is shorted.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for on-demand repair planning comprising one or more processing units and one or more memory units, the one or more processing units:
    model for a repair location in a multilevel repair network, wherein each level in the multilevel repair network comprises one or more repair locations at which unserviceable parts may be repaired:
        a good parts buffer for serviceable parts available to be put to service to help satisfy a demand, the good parts buffer having a profile that is determined according to on hand inventory and outgoing inventory for a predetermined time period;

a first buffer for unserviceable parts inspected at the repair location and determined to be serviceable without repair; and a second buffer for unserviceable parts inspected at the repair location and determined to be repairable at the repair location;

access a forecasted demand for a specified quantity of serviceable parts at a specified future time at the repair location;

estimate a quantity of parts available in the first buffer to help satisfy the forecasted demand and, if one or more parts are available in the first buffer, generate an operation plan for a use-as-is operation with respect to the one or more available parts, the use-as-is operation pulls the one or more available parts from the first buffer to the good parts buffer to help satisfy the forecasted demand; and if the forecasted demand is not fully satisfied, estimate a quantity of parts available in the second buffer to help satisfy the forecasted demand and, if one or more parts are available in the second buffer:

estimate the latest time at which a repair operation can begin with respect to the one or more available parts in the second buffer in order to help satisfy the forecasted demand, the repair operation pulls the one or more available parts from the second buffer to the good parts buffer to help satisfy the forecasted demand;

plan a repair order for the one or more available parts at the estimated latest time; and generate a just-in-time operation plan for the repair operation with respect to the one or more available parts consistent with the estimated latest time;

if the forecasted demand is not fully satisfied according to the operation plans for the use-as-is and repair operations at the repair location:

estimate a quantity of parts available in the first buffer of an upstream repair location to help satisfy the forecasted demand and, if any parts are available, generate an operation plan for a use-as-is operation with respect to the one or more available parts, the use-as-is operation pulls the one or more available parts from the first buffer of the upstream repair location to the good parts buffer of the upstream repair location.

2. The system of claim 1, wherein:

a part in the first buffer is available to help satisfy the forecasted demand if the part can be pulled into the good parts buffer at the specified time of the forecasted demand or earlier, considering any lead time associated with the use-as-is operation that must elapse; and a part in the second buffer is available to help satisfy the forecasted demand if the part can be pulled into the good parts buffer at the specified time of the forecasted demand or earlier, considering a repair lead time associated with the repair operation that must elapse.

3. The system of claim 1, wherein the latest time at which the repair operation can begin is the specified time of the forecasted demand minus a repair lead time associated with the repair operation.

4. The system of claim 1, wherein the accessing, estimating, estimating, estimating, planning, and generating are performed for each of a plurality of times within a planning horizon.

5. The system of claim 1, wherein the operation plans for the use-as-is and repair operations comprises just-in-time operation plans generated according to the forecasted demand.

6. The system of claim 1, wherein the one or more processing units automatically approve planned repair orders satisfying one or more predefined constraints.

7. The system of claim 1, wherein the one or more processing units attempt to procure parts from a good parts buffer of an upstream repair location that is more than one level upstream from the repair location before attempting to procure parts from the second buffer of the repair location according to the repair operation.

8. The system of claim 1, wherein the one or more processing units, where second parts may be substituted for first parts to help satisfy the forecasted demand, attempt to procure parts according to a user-specified sourcing sequence, the user-specified sourcing sequence specifying priorities for:

on hand first parts at the repair location;

first parts from the first buffer of the repair location according to the use-as-is operation;

first parts from the second buffer of the repair location according to the repair operation;

first parts from the good parts buffer of the upstream repair location according to the sourcing operation;

first parts from one or more other sources in a traditional manner;

on hand second parts at the repair location;

second parts from the first buffer of the repair location according to the use-as-is operation;

second parts from the second buffer of the repair location according to the repair operation; and second parts from the good parts buffer of the upstream repair location according to the sourcing operation;

second parts from one or more other sources in a traditional manner.

9. The system of claim 1, wherein the one or more processing units:

model for the repair location:

an unserviceable parts buffer for unserviceable parts encompassing a buffer for unserviceable parts received at the repair location but not yet inspected at the repair location, the second buffer, and a buffer for unserviceable parts inspected at the repair location and determined not to be repairable at the repair location; and a serviceable parts buffer for serviceable parts encompassing the good parts buffer and the first buffer; and track time-varying inventories of unserviceable parts in the unserviceable parts buffer and serviceable parts in the serviceable parts buffer, the unserviceable parts inventory being tracked separately from the serviceable parts inventory.

10. The system of claim 1, wherein the system comprises a replenishment planning engine of a service parts planning system.

11. A computer-implemented method for on-demand repair planning, using one or more computer systems each comprising one or more processing units and one or more memory units, the method comprising:

modeling using a computer, for a repair location in a multilevel repair network, wherein each level in the multilevel repair network comprises one or more repair locations at which unserviceable parts may be repaired:

a good parts buffer for serviceable parts available to be put to service to help satisfy a demand, the good parts buffer having a profile that is determined according to on hand inventory and outgoing inventory for a predetermined time period;

a first buffer for unserviceable parts inspected at the repair location and determined to be serviceable without repair; and a second buffer for unserviceable parts inspected at the repair location and determined to be repairable at the repair location;

accessing using the computer, a forecasted demand for a specified quantity of serviceable parts at a specified future time at the repair location;

estimating using the computer, a quantity of parts available in the first buffer to help satisfy the forecasted demand and, if one or more parts are available in the first buffer, generate an operation plan for a use-as-is operation with respect to the one or more available parts, the use-as-is operation pulls the one or more available parts from the first buffer to the good parts buffer to help satisfy the forecasted demand; and if the forecasted demand is not fully satisfied, estimating using a computer, a quantity of parts available in the second buffer to help satisfy the forecasted demand and, if one or more parts are available in the second buffer:

estimating using the computer, the latest time at which a repair operation can begin with respect to the one or more available parts in the second buffer in order to help satisfy the forecasted demand, the repair operation pulls the one or more available parts from the second buffer to the good parts buffer to help satisfy the forecasted demand;

planning using the computer, a repair order for the one or more available parts at the estimated latest time; and generating using the computer, a just-in-time operation plan for the repair operation with respect to the one or more available parts consistent with the estimated latest time;

if the forecasted demand is not fully satisfied according to the operation plans for the use-as-is and repair operations at the repair location:

estimating, using the computer, a quantity of parts available in the first buffer of an upstream repair location to help satisfy the forecasted demand and, if any parts are available, generating an operation plan for a use-as-is operation with respect to the one or more available parts, the use-as-is operation pulls the one or more available parts from the first buffer of the upstream repair location to the good parts buffer of the upstream repair location.

12. The method of claim 11, wherein:
a part in the first buffer is available to help satisfy the forecasted demand if the part can be pulled into the good parts buffer at the specified time of the forecasted demand or earlier, considering any lead time associated with the use-as-is operation that must elapse; and
a part in the second buffer is available to help satisfy the forecasted demand if the part can be pulled into the good parts buffer at the specified time of the forecasted demand or earlier, considering a repair lead time associated with the repair operation that must elapse.

13. The method of claim 11, wherein the latest time at which the repair operation can begin is the specified time of the forecasted demand minus a repair lead time associated with the repair operation.

14. The method of claim 11, wherein the accessing, estimating, estimating, estimating, planning, and generating are performed for each of a plurality of times within a planning horizon.

15. The method of claim 11, wherein the operation plans for the use-as-is and repair operations comprises just-in-time operation plans generated according to the forecasted demand.

16. The method of claim 11, wherein the one or more processing units automatically approve planned repair orders satisfying one or more predefined constraints.

17. The method of claim 11, further comprising attempting using the computer, to procure parts from a good parts buffer of an upstream repair location that is more than one level upstream from the repair location before attempting to procure parts from the second buffer of the repair location according to the repair operation.

18. The method of claim 11, further comprising, where second parts may be substituted for first parts to help satisfy the forecasted demand, attempting to procure parts according to a user-specified sourcing sequence, the user-specified sourcing sequence specifying priorities for:
on hand first parts at the repair location;
first parts from the first buffer of the repair location according to the use-as-is operation;
first parts from the second buffer of the repair location according to the repair operation;
first parts from the good parts buffer of the upstream repair location according to the sourcing operation;
first parts from one or more other sources in a traditional manner;
on hand second parts at the repair location;
second parts from the first buffer of the repair location according to the use-as-is operation;
second parts from the second buffer of the repair location according to the repair operation; and
second parts from the good parts buffer of the upstream repair location according to the sourcing operation;
second parts from one or more other sources in a traditional manner.

19. The method of claim 11, further comprising:
modeling using the computer, for the repair location:
an unserviceable parts buffer for unserviceable parts encompassing a buffer for unserviceable parts received at the repair location but not yet inspected at the repair location, the second buffer, and a buffer for unserviceable parts inspected at the repair location and determined not to be repairable at the repair location; and
a serviceable parts buffer for serviceable parts encompassing the good parts buffer and the first buffer; and
track time-varying inventories of unserviceable parts in the unserviceable parts buffer and serviceable parts in the serviceable parts buffer, the unserviceable parts inventory being tracked separately from the serviceable parts inventory.

20. The method of claim 11, wherein the method is performed using a replenishment planning engine of a service parts planning system.

21. A non-transitory computer-readable medium embodied with software for on-demand repair planning, the software when executed using one or more computers is configured to:
model for a repair location in a multilevel repair network, wherein each level in the multilevel repair network comprises one or more repair locations at which unserviceable parts may be repaired:
a good parts buffer for serviceable parts available to be put to service to help satisfy a demand, the good parts buffer having a profile that is determined according to on hand inventory and outgoing inventory for a predetermined time period;

a first buffer for unserviceable parts inspected at the repair location and determined to be serviceable without repair; and a second buffer for unserviceable parts inspected at the repair location and determined to be repairable at the repair location;

access a forecasted demand for a specified quantity of serviceable parts at a specified future time at the repair location;

estimate a quantity of parts available in the first buffer to help satisfy the forecasted demand and, if one or more parts are available in the first buffer, generate an operation plan for a use-as-is operation with respect to the one or more available parts, the use-as-is operation pulls the one or more available parts from the first buffer to the good parts buffer to help satisfy the forecasted demand; and if the forecasted demand is not fully satisfied, estimate a quantity of parts available in the second buffer to help satisfy the forecasted demand and, if one or more parts are available in the second buffer:

estimate the latest time at which a repair operation can begin with respect to the one or more available parts in the second buffer in order to help satisfy the forecasted demand, the repair operation pulls the one or more available parts from the second buffer to the good parts buffer to help satisfy the forecasted demand;

plan a repair order for the one or more available parts at the estimated latest time; and generate a just-in-time operation plan for the repair operation with respect to the one or more available parts consistent with the estimated latest time;

if the forecasted demand is not fully satisfied according to the operation plans for the use-as-is and repair operations at the repair location:

estimate a quantity of parts available in the first buffer of an upstream repair location to help satisfy the forecasted demand and, if any parts are available, generate an operation plan for a use-as-is operation with respect to the one or more available parts, the use-as-is operation pulls the one or more available parts from the first buffer of the upstream repair location to the good parts buffer of the upstream repair location.

22. The computer-readable medium of claim 21, wherein:
a part in the first buffer is available to help satisfy the forecasted demand if the part can be pulled into the good parts buffer at the specified time of the forecasted demand or earlier, considering any lead time associated with the use-as-is operation that must elapse; and
a part in the second buffer is available to help satisfy the forecasted demand if the part can be pulled into the good parts buffer at the specified time of the forecasted demand or earlier, considering a repair lead time associated with the repair operation that must elapse.

23. The computer-readable medium of claim 21, wherein the latest time at which the repair operation can begin is the specified time of the forecasted demand minus a repair lead time associated with the repair operation.

24. The computer-readable medium software of claim 21, wherein the accessing, estimating, estimating, estimating, planning, and generating are performed for each of a plurality of times within a planning horizon.

25. The computer-readable medium software of claim 21, wherein the operation plans for the use-as-is and repair operations comprises just-in-time operation plans generated according to the forecasted demand.

26. The computer-readable medium of claim 21, further configured to automatically approve planned repair orders satisfying one or more predefined constraints.

27. The computer-readable medium of claim 21, further configured to attempt to procure parts from a good parts buffer of an upstream repair location that is more than one level upstream from the repair location before attempting to procure parts from the second buffer of the repair location according to the repair operation.

28. The computer-readable medium of claim 21, further configured to, where second parts may be substituted for first parts to help satisfy the forecasted demand, attempt to procure parts according to a user-specified sourcing sequence, the user-specified sourcing sequence specifying priorities for:
on hand first parts at the repair location;
first parts from the first buffer of the repair location according to the use-as-is operation;
first parts from the second buffer of the repair location according to the repair operation;
first parts from the good parts buffer of the upstream repair location according to the sourcing operation;
first parts from one or more other sources in a traditional manner;
on hand second parts at the repair location;
second parts from the first buffer of the repair location according to the use-as-is operation;
second parts from the second buffer of the repair location according to the repair operation; and
second parts from the good parts buffer of the upstream repair location according to the sourcing operation;
second parts from one or more other sources in a traditional manner.

29. The computer-readable medium of claim 21, further configured to:
model for the repair location:
an unserviceable parts buffer for unserviceable parts encompassing a buffer for unserviceable parts received at the repair location but not yet inspected at the repair location, the second buffer, and a buffer for unserviceable parts inspected at the repair location and determined not to be repairable at the repair location; and
a serviceable parts buffer for serviceable parts encompassing the good parts buffer and the first buffer; and
track time-varying inventories of unserviceable parts in the unserviceable parts buffer and serviceable parts in the serviceable parts buffer, the unserviceable parts inventory being tracked separately from the serviceable parts inventory.

30. The computer-readable medium of claim 21, wherein the software comprises a replenishment planning engine of a service parts planning system.

31. A computer-implemented system of on-demand repair planning comprising one or more processing units and one or more memory units, the one or more processing units:
for each of a plurality of repair locations in a multi-level repair network, each level comprising one or more repair locations at which unserviceable parts may be repaired, model:
a good parts buffer for serviceable parts available to be put to service to help satisfy a demand;

a first buffer for unserviceable parts inspected at the repair location and determined to be serviceable without repair;

a second buffer for unserviceable parts inspected at the repair location and determined to be repairable at the repair location;

an unserviceable parts buffer for unserviceable parts encompassing a buffer for unserviceable parts received at the repair location but not yet inspected at the repair location, the second buffer, and a buffer for unserviceable parts inspected at the repair location and determined not to be repairable at the repair location; and a serviceable parts buffer for serviceable parts encompassing the good parts buffer and the first buffer;

for each of a plurality of future times within a planning horizon, access a forecasted demand for a specified quantity of serviceable parts at the future time at a particular repair location;

for the particular repair location for a particular forecasted demand, estimate a quantity of parts available in the first buffer of the particular repair location to help satisfy the forecasted demand and, if one or more parts are available in the first buffer, generate an operation plan for a use-as-is operation with respect to the one or more available parts, the use-as-is operation pulls the one or more available parts from the first buffer of the particular repair location to the good parts buffer of the particular repair location to help satisfy the forecasted demand;

if the particular forecasted demand is not fully satisfied, estimate a quantity of parts available in the second buffer of the particular repair location to help satisfy the particular forecasted demand and, if one or more parts are available in the second buffer:

estimate the latest time at which a repair operation can begin with respect to the one or more available parts in order to help satisfy the particular forecasted demand, the repair operation pulls the one or more available parts from the second buffer of the particular repair location to the good parts buffer of the particular repair location to help satisfy the particular forecasted demand;

plan a repair order for the one or more available parts at the estimated latest time; and generate a just-in-time operation plan for the repair operation with respect to the one or more available parts consistent with the estimated latest time;

if the particular forecasted demand is not fully satisfied according to the operation plans for the use-as-is and repair operations at the particular repair location:

estimate a quantity of parts available in the first buffer of a first upstream repair location to help satisfy the particular forecasted demand and, if any parts are available:

generate an operation plan for a use-as-is operation with respect to the one or more available parts, the use-as-is operation pulls the one or more available parts from the first buffer of the first upstream repair location to the good parts buffer of the first upstream repair location;

plan a move order for the one or more available parts; and generate an operation plan for a sourcing operation with respect to the one or more available parts, the sourcing operation moves the one or more available parts from the good parts buffer of the first upstream repair location to the good parts buffer of the particular repair location to help satisfy the particular forecasted demand; and if the particular forecasted demand is not fully satisfied, estimate a quantity of parts available in the second buffer of the first upstream repair location to help satisfy the particular forecasted demand and, if any parts are available:

estimate the latest time at which a repair operation can begin with respect to the one or more available parts at the first upstream repair location in order to help satisfy the particular forecasted demand, the repair operation pulls the one or more available parts from the second buffer of the first upstream repair location to the good parts buffer of the first upstream repair location;

plan a repair order for the one or more available parts at the estimated latest time;

generate a just-in-time operation plan for the repair operation with respect to the one or more available parts consistent with the estimated latest time;

plan a move order for the one or more available parts; and generate an operation plan for a sourcing operation with respect to the one or more available parts, the sourcing operation moves the one or more available parts from the good parts buffer of the first upstream repair location to the good parts buffer of the downstream repair location to help satisfy the particular forecasted demand;

if the particular forecasted demand is not fully satisfied according to the operation plans for the use-as-is, repair, and sourcing operations at the first upstream repair location, proceed to plan orders and generate associated operation plans for each of a succession of additional upstream repair locations until either:

the particular forecasted demand is fully satisfied; or it is estimated that no quantity of parts is available at any additional upstream repair location to help satisfy the particular forecasted demand, in which case the particular forecasted demand must be shorted or parts must be procured from one or more other sources to satisfy the particular forecasted demand; and track time-varying inventories of unserviceable parts in the unserviceable parts buffers and serviceable parts in the serviceable parts buffers, the unserviceable parts inventory for a repair location being tracked separately from the serviceable parts inventory for a repair location.

32. A computer-implemented system of on-demand repair planning comprising one or more processing units and one or more memory units, the one or more processing units:

access a forecasted demand for a specified quantity of serviceable parts at a specified future time at a repair location;

model, for an upstream repair location within a multilevel repair network, wherein each level in the multilevel repair network comprises one or more repair locations at which unserviceable parts may be repaired:

a good parts buffer for serviceable parts available to be put to service to help satisfy a demand, the good parts buffer having a profile that is determined according to on hand inventory and outgoing inventory for a predetermined time period;

a first buffer for unserviceable parts inspected at the upstream repair location and determined to be serviceable without repair; and a second buffer for unserviceable parts inspected at the upstream repair location and determined to be repairable at the upstream repair location; and estimate a quantity of parts available in the first buffer of the upstream repair location to help satisfy the forecasted demand and, if any parts are available:
  generate an operation plan for a use-as-is operation with respect to the one or more available parts, the use-as-is operation pulls the one or more available parts from the first buffer of the upstream repair location to the good parts buffer of the upstream repair location;
  plan a move order for the one or more available parts; and
  generate an operation plan for a sourcing operation with respect to the one or more available parts, the sourcing operation moves the one or more available parts from the good parts buffer of the upstream repair location to the good parts buffer of the repair location to help satisfy the forecasted demand; and if the forecasted demand is not fully satisfied, estimate a quantity of parts available in the second buffer of the upstream repair location to help satisfy the forecasted demand and, if any parts are available:
  estimate the latest time at which a repair operation can begin with respect to the one or more available parts at the upstream repair location in order to help satisfy the forecasted demand, the repair operation pulls the one or more available parts from the second buffer of the upstream repair location to the good parts buffer of the upstream repair location;
  plan a repair order for the one or more available parts at the estimated latest time;
  generate an operation plan for the repair operation with respect to the one or more available parts;
  plan a move order for the one or more available parts; and
  generate an operation plan for a sourcing operation with respect to the one or more available parts, the sourcing operation moves the one or more available parts from the good parts buffer of the upstream repair location to the good parts buffer of the downstream repair location to help satisfy the forecasted demand;

if the forecasted demand is not fully satisfied according to the operation plans for the use-as-is and repair operations at the repair location:
  estimate a quantity of parts available in the first buffer of the upstream repair location to help satisfy the forecasted demand and, if any parts are available, generate an operation plan for a use-as-is operation with respect to the one or more available parts, the use-as-is operation pulls the one or more available parts from the first buffer of the upstream repair location to the good parts buffer of the upstream repair location.

33. The system of claim 32, wherein:
a part in the first buffer of the upstream repair location is available to help satisfy the forecasted demand if the part can be moved into the good parts buffer of the repair location at the specified time of the forecasted demand or earlier, taking into account any lead times associated with the use-as-is operation at the upstream repair location and the sourcing operation; and
a part in the second buffer of the upstream repair location is available to help satisfy the forecasted demand if the part can be pulled into the good parts buffer of the repair location at the specified time of the forecasted demand or earlier, taking into account a repair lead time associated with the repair operation at the upstream repair location and the sourcing operation.

34. The system of claim 32, wherein the latest time at which the repair operation can begin at the upstream repair location is the specified time of the forecasted demand minus a repair lead time associated with the repair operation at the upstream location minus a move lead time associated with the sourcing operation.

35. The system of claim 32, wherein the repair lead time associated with the repair operation is specified for each part for each repair location and comprises one or more full days.

36. The system of claim 32, wherein the move order associated with the sourcing operation specifies a Bill of Distribution (BOD) and a move lead time associated with the sourcing operation comprises one or more full days.

37. The system of claim 32, wherein the one or more processing units, for the move order for the available parts pulled from the first buffer of the upstream repair location to the good parts buffer of the upstream repair location:
  estimate the latest time at which the sourcing operation can begin with respect to the one or more available parts in order to help satisfy the forecasted demand; and
  plan the move order for the one or more available parts at the estimated latest time.

38. The system of claim 32, wherein the one or more processing units automatically approve planned move orders satisfying one or more predefined constraints.

39. The system of claim 32, wherein the one or more processing units model a procurement operation that encompasses the use-as-is operation at the repair location, the repair operation at the repair location, and the sourcing operation.

40. The system of claim 32, wherein the one or more processing units:
  model goods parts buffers, first buffers, and second buffers for each of one or more additional upstream repair locations within the multilevel repair network; and
  if the forecasted demand is not fully satisfied according to the operation plans for the use-as-is, repair, and sourcing operations, proceed to plan orders and generate associated operation plans for each of a succession of additional upstream repair locations until either:
    the forecasted demand is fully satisfied; or
    it is estimated that no quantity of parts is available at any additional upstream repair location to help satisfy the forecasted demand, in which case the forecasted demand must be shorted or parts must be procured from one or more other sources to satisfy the forecasted demand.

41. The system of claim 32, wherein the one or more processing units, where second parts may be substituted for first parts to help satisfy the forecasted demand, attempt to procure parts according to the following sequence to satisfy the forecasted demand:
  on hand first parts at the repair location;
  first parts from the first buffer of the repair location according to the use-as-is operation;
  on hand second parts at the repair location;
  second parts from the first buffer of the repair location according to the use-as-is operation;
  first parts from the good parts buffer of the upstream repair location according to the sourcing operation;
  second parts from the good parts buffer of the upstream repair location according to the sourcing operation;
  first parts from the second buffer of the repair location according to the repair operation;
  second parts from the second buffer of the repair location according to the repair operation;

first parts from one or more other sources in a traditional manner; and
second parts from one or more other sources in a traditional manner.

42. The system of claim 32, wherein the one or more processing units, where second parts may be substituted for first parts to help satisfy the forecasted demand, attempt to procure parts according to the following sequence to satisfy the forecasted demand:
   on hand first parts at the repair location;
   first parts from the first buffer of the repair location according to the use-as-is operation;
   first parts from the good parts buffer of the upstream repair location according to the sourcing operation;
   first parts from the second buffer of the repair location according to the repair operation;
   on hand second parts at the repair location;
   second parts from the first buffer of the repair location according to the use-as-is operation;
   second parts from the good parts buffer of the upstream repair location according to the sourcing operation;
   second parts from the second buffer of the repair location according to the repair operation;
   first parts from one or more other sources in a traditional manner; and
   second parts from one or more other sources in a traditional manner.

43. A computer-implemented method for on-demand repair planning, using one or more computer systems each comprising one or more processing units and one or more memory units, the method comprising:
   accessing using a computer, a forecasted demand for a specified quantity of serviceable parts at a specified future time at a repair location;
   modeling using the computer, for an upstream repair location within a multilevel repair network, wherein each level in the multilevel repair network comprises one or more repair locations at which unserviceable parts may be repaired:
      a good parts buffer for serviceable parts available to be put to service to help satisfy a demand, the good parts buffer having a profile that is determined according to on hand inventory and outgoing inventory for a predetermined time period;
      a first buffer for unserviceable parts inspected at the upstream repair location and determined to be serviceable without repair; and
      a second buffer for unserviceable parts inspected at the upstream repair location and determined to be repairable at the upstream repair location; and
   estimating using the computer, a quantity of parts available in the first buffer of the upstream repair location to help satisfy the forecasted demand and, if any parts are available in the first buffer:
      generating using the computer, an operation plan for a use-as-is operation with respect to the one or more available parts, the use-as-is operation pulls the one or more available parts from the first buffer of the upstream repair location to the good parts buffer of the upstream repair location;
      planning using the computer, a move order for the one or more available parts; and
      generating using the computer, an operation plan for a sourcing operation with respect to the one or more available parts, the sourcing operation moves the one or more available parts from the good parts buffer of the upstream repair location to the good parts buffer of the repair location to help satisfy the forecasted demand; and
   if the forecasted demand is not fully satisfied, estimating using the computer, a quantity of parts available in the second buffer of the upstream repair location to help satisfy the forecasted demand and, if any parts are available:
      estimating the latest time at which a repair operation can begin with respect to the one or more available parts at the upstream repair location in order to help satisfy the forecasted demand, the repair operation pulls the one or more available parts from the second buffer of the upstream repair location to the good parts buffer of the upstream repair location;
      planning a repair order for the one or more available parts at the estimated latest time;
      generating an operation plan for the repair operation with respect to the one or more available parts;
      planning a move order for the one or more available parts; and
      generating an operation plan for a sourcing operation with respect to the one or more available parts, the sourcing operation moves the one or more available parts from the good parts buffer of the upstream repair location to the good parts buffer of the downstream repair location to help satisfy the forecasted demand;
   if the forecasted demand is not fully satisfied according to the operation plans for the use-as-is and repair operations at the repair location:
      estimating, using a computer, a quantity of parts available in the first buffer of the upstream repair location to help satisfy the forecasted demand and, if any parts are available, generating an operation plan for a use-as-is operation with respect to the one or more available parts, the use-as-is operation pulls the one or more available parts from the first buffer of the upstream repair location to the good parts buffer of the upstream repair location.

44. The method of claim 43, wherein:
   a part in the first buffer of the upstream repair location is available to help satisfy the forecasted demand if the part can be moved into the good parts buffer of the repair location at the specified time of the forecasted demand or earlier, taking into account any lead times associated with the use-as-is operation at the upstream repair location and the sourcing operation; and
   a part in the second buffer of the upstream repair location is available to help satisfy the forecasted demand if the part can be pulled into the good parts buffer of the repair location at the specified time of the forecasted demand or earlier, taking into account a repair lead time associated with the repair operation at the upstream repair location and the sourcing operation.

45. The method of claim 43, wherein the latest time at which the repair operation can begin at the upstream repair location is the specified time of the forecasted demand minus a repair lead time associated with the repair operation at the upstream location minus a move lead time associated with the sourcing operation.

46. The method of claim 43, wherein the repair lead time associated with the repair operation is specified for each part for each repair location and comprises one or more full days.

47. The method of claim 43, wherein the move order associated with the sourcing operation specifies a Bill of Distribution (BOD) and a move lead time associated with the sourcing operation comprises one or more full days.

48. The method of claim 43, further comprising, for the move order for the available parts pulled from the first buffer of the upstream repair location to the good parts buffer of the upstream repair location:
 estimating the latest time at which the sourcing operation can begin with respect to the one or more available parts in order to help satisfy the forecasted demand; and
 planning the move order for the one or more available parts at the estimated latest time.

49. The method of claim 43, further comprising automatically approving planned move orders satisfying one or more predefined constraints.

50. The method of claim 43, further comprising modeling a procurement operation that encompasses the use-as-is operation at the repair location, the repair operation at the repair location, and the sourcing operation.

51. The method of claim 43, further comprising:
 modeling using the computer, goods parts buffers, first buffers, and second buffers for each of one or more additional upstream repair locations within the multilevel repair network; and
 if the forecasted demand is not fully satisfied according to the operation plans for the use-as-is, repair, and sourcing operations, proceeding to plan orders and generate associated operation plans for each of a succession of additional upstream repair locations until either:
  the forecasted demand is fully satisfied; or
  it is estimated that no quantity of parts is available at any additional upstream repair location to help satisfy the forecasted demand, in which case the forecasted demand must be shorted or parts must be procured from one or more other sources to satisfy the forecasted demand.

52. The method of claim 43, further comprising, where second parts may be substituted for first parts to help satisfy the forecasted demand, attempting to procure parts according to the following sequence to satisfy the forecasted demand:
 on hand first parts at the repair location;
 first parts from the first buffer of the repair location according to the use-as-is operation;
 on hand second parts at the repair location;
 second parts from the first buffer of the repair location according to the use-as-is operation;
 first parts from the good parts buffer of the upstream repair location according to the sourcing operation;
 second parts from the good parts buffer of the upstream repair location according to the sourcing operation;
 first parts from the second buffer of the repair location according to the repair operation;
 second parts from the second buffer of the repair location according to the repair operation;
 first parts from one or more other sources in a traditional manner; and
 second parts from one or more other sources in a traditional manner.

53. The method of claim 43, further comprising, where second parts may be substituted for first parts to help satisfy the forecasted demand, attempting to procure parts according to the following sequence to satisfy the forecasted demand:
 on hand first parts at the repair location;
 first parts from the first buffer of the repair location according to the use-as-is operation;
 first parts from the good parts buffer of the upstream repair location according to the sourcing operation;
 first parts from the second buffer of the repair location according to the repair operation;
 on hand second parts at the repair location;
 second parts from the first buffer of the repair location according to the use-as-is operation;
 second parts from the good parts buffer of the upstream repair location according to the sourcing operation;
 second parts from the second buffer of the repair location according to the repair operation;
 first parts from one or more other sources in a traditional manner; and
 second parts from one or more other, sources in a traditional manner.

54. A non-transitory computer-readable medium embodied with software for on-demand repair planning, the software when executed using one or more computers is configured to:
 access a forecasted demand for a specified quantity of serviceable parts at a specified future time at a repair location;
 model, for an upstream repair location within a multilevel repair network, wherein each level in the multilevel repair network comprises one or more repair locations at which unserviceable parts may be repaired:
  a good parts buffer for serviceable parts available to be put to service to help satisfy a demand, the good parts buffer having a profile that is determined according to on hand inventory and outgoing inventory for a predetermined time period;
  a first buffer for unserviceable parts inspected at the upstream repair location and determined to be serviceable without repair; and
  a second buffer for unserviceable parts inspected at the upstream repair location and determined to be repairable at the upstream repair location; and
 estimate a quantity of parts available in the first buffer of the upstream repair location to help satisfy the forecasted demand and, if any parts are available in the first buffer:
  generate an operation plan for a use-as-is operation with respect to the one or more available parts, the use-as-is operation pulls the one or more available parts from the first buffer of the upstream repair location to the good parts buffer of the upstream repair location;
  plan a move order for these available parts and generate an operation plan for a sourcing operation with respect to the one or more available parts, the sourcing operation moves the one or more available parts from the good parts buffer of the upstream repair location to the good parts buffer of the repair location to help satisfy the forecasted demand; and
 if the forecasted demand is not fully satisfied, estimate a quantity of parts available in the second buffer of the upstream repair location to help satisfy the forecasted demand and, if any parts are available in the second buffer:
  estimate the latest time at which a repair operation can begin with respect to the one or more available parts at the upstream repair location in order to help satisfy the forecasted demand, the repair operation pulls the one or more available parts from the second buffer of the upstream repair location to the good parts buffer of the upstream repair location;
  plan a repair order for the one or more available parts at the estimated latest time;
  generate an operation plan for the repair operation with respect to the one or more available parts;
  plan a move order for the one or more available parts; and generate an operation plan for a sourcing operation with respect to the one or more available parts, the sourcing operation moves the one or more available parts from the good parts buffer of the upstream repair location to the good parts buffer of the downstream repair location to help satisfy the forecasted demand;

if the forecasted demand is not fully satisfied according to the operation plans for the use-as-is and repair operations at the repair location:

estimate a quantity of parts available in the first buffer of the upstream repair location to help satisfy the forecasted demand and, if any parts are available, generate an operation plan for a use-as-is operation with respect to the one or more available parts, the use-as-is operation pulls the one or more available parts from the first buffer of the upstream repair location to the good parts buffer of the upstream repair location.

55. The computer-readable medium of claim 54, wherein:
a part in the first buffer of the upstream repair location is available to help satisfy the forecasted demand if the part can be moved into the good parts buffer of the repair location at the specified time of the forecasted demand or earlier, taking into account any lead times associated with the use-as-is operation at the upstream repair location and the sourcing operation; and
a part in the second buffer of the upstream repair location is available to help satisfy the forecasted demand if the part can be pulled into the good parts buffer of the repair location at the specified time of the forecasted demand or earlier, taking into account a repair lead time associated with the repair operation at the upstream repair location and the sourcing operation.

56. The computer-readable medium of claim 54, wherein the latest time at which the repair operation can begin at the upstream repair location is the specified time of the forecasted demand minus a repair lead time associated with the repair operation at the upstream location minus a move lead time associated with the sourcing operation.

57. The computer-readable medium of claim 54, wherein the repair lead time associated with the repair operation is specified for each part for each repair location and comprises one or more full days.

58. The computer-readable medium of claim 54, wherein the move order associated with the sourcing operation specifies a Bill of Distribution (BOD) and a move lead time associated with the sourcing operation comprises one or more full days.

59. The computer-readable medium of claim 54, further configured to, for the move order for the available parts pulled from the first buffer of the upstream repair location to the good parts buffer of the upstream repair location:

estimate the latest time at which the sourcing operation can begin with respect to the one or more available parts in order to help satisfy the forecasted demand; and
plan the move order for the one or more available parts at the estimated latest time.

60. The computer-readable medium of claim 54, further configured to automatically approve planned move orders satisfying one or more predefined constraints.

61. The computer-readable medium of claim 54, further configured to model a procurement operation that encompasses the use-as-is operation at the repair location, the repair operation at the repair location, and the sourcing operation.

62. The computer-readable medium of claim 54, further configured to:

model goods parts buffers, first buffers, and second buffers for each of one or more additional upstream repair locations within the multilevel repair network; and
if the forecasted demand is not fully satisfied according to the operation plans for the use-as-is, repair, and sourcing operations, proceed to plan orders and generate associated operation plans for each of a succession of additional upstream repair locations until either:
the forecasted demand is fully satisfied; or
it is estimated that no quantity of parts is available at any additional upstream repair location to help satisfy the forecasted demand, in which case the forecasted demand must be shorted or parts must be procured from one or more other sources to satisfy the forecasted demand.

63. The computer-readable medium of claim 54, further configured to, where second parts may be substituted for first parts to help satisfy the forecasted demand, attempt to procure parts according to the following sequence to satisfy the forecasted demand:

on hand first parts at the repair location;
first parts from the first buffer of the repair location according to the use-as-is operation;
on hand second parts at the repair location;
second parts from the first buffer of the repair location according to the use-as-is operation;
first parts from the good parts buffer of the upstream repair location according to the sourcing operation;
second parts from the good parts buffer of the upstream repair location according to the sourcing operation;
first parts from the second buffer of the repair location according to the repair operation;
second parts from the second buffer of the repair location according to the repair operation;
first parts from one or more other sources in a traditional manner; and
second parts from one or more other sources in a traditional manner.

64. The computer-readable medium of claim 54, further configured to, where second parts may be substituted for first parts to help satisfy the forecasted demand, attempt to procure parts according to the following sequence to satisfy the forecasted demand:

on hand first parts at the repair location;
first parts from the first buffer of the repair location according to the use-as-is operation;
first parts from the good parts buffer of the upstream repair location according to the sourcing operation;
first parts from the second buffer of the repair location according to the repair operation;
on hand second parts at the repair location;
second parts from the first buffer of the repair location according to the use-as-is operation;
second parts from the good parts buffer of the upstream repair location according to the sourcing operation;
second parts from the second buffer of the repair location according to the repair operation;
first parts from one or more other sources in a traditional manner; and
second parts from one or more other sources in a traditional manner.

* * * * *